United States Patent
Liu

(10) Patent No.: US 10,587,322 B2
(45) Date of Patent: Mar. 10, 2020

(54) CHANNEL STATE INFORMATION MEASUREMENT AND FEEDBACK METHOD AND APPARATUS

(71) Applicant: Huawei Technologies Co., Ltd., Shenzhen (CN)

(72) Inventor: Kunpeng Liu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/971,599

(22) Filed: May 4, 2018

(65) Prior Publication Data

US 2018/0254816 A1 Sep. 6, 2018

Related U.S. Application Data

(63) Continuation of application No. PCT/CN2015/094077, filed on Nov. 7, 2015.

(51) Int. Cl.
*H04B 7/06* (2006.01)
*H04B 7/0456* (2017.01)
*H04W 24/08* (2009.01)

(52) U.S. Cl.
CPC ......... *H04B 7/0626* (2013.01); *H04B 7/0456* (2013.01); *H04B 7/0469* (2013.01); *H04B 7/0478* (2013.01); *H04B 7/0639* (2013.01); *H04W 24/08* (2013.01)

(58) Field of Classification Search
CPC .... H04B 74/04; H04B 7/0456; H04B 7/0469; H04B 7/0478; H04B 7/0626; H04B 7/0639; H04L 5/0048; H04L 5/0057; H04L 5/006; H04W 24/08
See application file for complete search history.

(56) References Cited

U.S. PATENT DOCUMENTS

| | | |
|---|---|---|
| 2015/0063267 A1 | 3/2015 | Ko et al. |
| 2015/0215018 A1* | 7/2015 | Xiong ................... H04W 24/10 370/329 |
| 2015/0222335 A1* | 8/2015 | Jing ..................... H04B 7/0469 375/267 |
| 2015/0280801 A1 | 10/2015 | Xin et al. |
| 2015/0288499 A1 | 10/2015 | Nam et al. |

(Continued)

FOREIGN PATENT DOCUMENTS

| | | |
|---|---|---|
| CN | 103119859 A | 5/2013 |
| CN | 103634085 A | 3/2014 |
| CN | 105009626 A | 10/2015 |

OTHER PUBLICATIONS

Ericsson, "FD-MIMO codebook structure, design features, and dimensioning," 3GPP TSG-RAN WG1#82, R1-154557, Beijing, China, Aug. 24-28, 2015, 8 pages.

(Continued)

*Primary Examiner* — Mewale A Ambaye
(74) *Attorney, Agent, or Firm* — Slater Matsil, LLP

(57) ABSTRACT

Embodiments of the present invention provide a CSI measurement and feedback method and apparatus. In some embodiments, a terminal receives a reference signal sent by a base station, and the terminal performs channel measurement based on the reference signal, to obtain first CSI carrying a target index I1. Different cases of the target index exist. The terminal sends the first CSI.

16 Claims, 13 Drawing Sheets

(56) References Cited

U.S. PATENT DOCUMENTS

| | | | | |
|---|---|---|---|---|
| 2015/0341092 | A1* | 11/2015 | Park | H04B 7/0469 |
| | | | | 370/329 |
| 2017/0202025 | A1* | 7/2017 | Ouchi | H04W 16/32 |
| 2018/0254817 | A1* | 9/2018 | Liu | H04B 7/0626 |

OTHER PUBLICATIONS

Samsung, "Rank 1-2 codebook for Class A CSI reporting," 3GPP TSG RAN WG1 Meeting #82b, R1-156121, Malmo, Sweden, Oct. 5-9, 2015, 14 pages.

Huawei et al., "Codebook design for 16 ports 2D antenna arrays," 3GPP TSG RAN WG1 Meeting #82bis, R1-155077 Malmo, Sweden, Oct. 5-9, 2015, 8 pages.

* cited by examiner

Configuration Information of Codebook-Subset-SelectionConfig

| Codebook-Subset-SelectionCondfig | Codeword index of W2 | (s₁, s₂) |
|---|---|---|
|  Condfig 1 | 0–3 | (1, 1) |
|  Condfig 2 | 0–7, 16–23 | (2, 2) |
|  Condfig 3 | 0–3, 8–11, 20–23, 28–31 | (2, 2) |
|  Condfig 4 | 0–15 | (2, 2) |

CHANNEL STATE INFORMATION MEASUREMENT AND FEEDBACK METHOD AND APPARATUS

CROSS-REFERENCE TO RELATED APPLICATIONS

This application is a continuation of International Application No. PCT/CN2015/094077, filed on Nov. 7, 2015, the disclosure of which is hereby incorporated by reference in its entirety.

TECHNICAL FIELD

The present invention relates to the field of communications technologies, and in particular, to a CSI (Channel State Information) measurement and feedback method and apparatus.

BACKGROUND

As wireless communications technologies develop, higher requirements are imposed on a system throughput and a system rate, and a MIMO (Multiple-Input Multiple-Output) technology emerges. In the MIMO technology, a spatial feature can be fully used to increase a system capacity without increasing transmit power and bandwidth. In addition, the MIMO technology plays an important role in increasing a peak rate and improving reliability of data transmission, expanding coverage, suppressing interference, increasing the system capacity and the system throughput. As requirements on a rate and spectral efficiency constantly increase, enhancement and optimization of the MIMO technology are always an important direction for LTE system evolution.

A 1D antenna is used in a conventional 2D MIMO technology. To be specific, the antenna is placed in only a horizontal direction. As shown in FIG. 1A and FIG. 1B, a fixed downtilt is used for all terminals, and a beam direction can be adjusted in only the horizontal direction. As technologies develop, a 2D antenna is introduced, that is, a 3D MIMO technology. As shown in FIG. 1C, FIG. 1D, and FIG. 1E, a beam direction of the 2D antenna can be adjusted in both the horizontal direction and a vertical direction, and beam direction adjustment is freer. In the 3D MIMO technology, an expression form of W1 is shown in Formula 1:

$$W_1 = \begin{bmatrix} \tilde{X}_1 \otimes \tilde{X}_2 & 0 \\ 0 & \tilde{X}_1 \otimes \tilde{X}_2 \end{bmatrix} \quad \text{(Formula 1)}$$

where $\tilde{X}_1$ and $\tilde{X}_2$ are vectors in different dimensions or vector combinations. In this case, when feeding back a W1-related PMI to a base station, a terminal needs to feed back PMIs (Precoding Matrix Indicators) in two dimensions. However, currently, there is no CSI measurement and feedback method specific to the 3D MIMO technology.

SUMMARY

Embodiments of the present invention provide a CSI measurement and feedback method, to resolve a disadvantage in the prior art that there is no CSI measurement and feedback method specific to a 3D MIMO technology.

A channel state information (CSI) measurement and feedback method includes receiving, by a terminal, a reference signal sent by a base station. The method also includes performing, by the terminal, channel measurement based on the reference signal, to obtain first CSI carrying a target index, where the target index is a first joint index, and the first joint index is an index jointly generated based on a first precoding matrix indicator PMI and a second PMI; or the target index is a second joint index, and the second joint index is an index jointly generated based on a rank indicator RI, the first PMI, and the second PMI; or the target index is the first PMI and the second PMI; or the target index is a third joint index and the second PMI, and the third joint index is an index jointly generated based on the first PMI and the RI; or the target index is a fourth joint index and the first PMI, the fourth joint index is an index jointly generated based on the second PMI and the RI, the first PMI indicates an index of a codeword in a first dimension in W1, and the second PMI indicates an index of a codeword in a second dimension in W1. The method also includes sending, by the terminal, the first CSI.

A channel state information (CSI) measurement and feedback apparatus includes a receiving unit, configured to receive a reference signal sent by a base station. The apparatus also includes a processing unit, configured to perform channel measurement based on the reference signal, to obtain first CSI carrying a target index. The target index is a first joint index, and the first joint index is an index jointly generated based on a first precoding matrix indicator PMI and a second PMI; or the target index is a second joint index, and the second joint index is an index jointly generated based on a rank indicator RI, the first PMI, and the second PMI; or the target index is the first PMI and the second PMI; or the target index is a third joint index and the second PMI, and the third joint index is an index jointly generated based on the first PMI and the RI; or the target index is a fourth joint index and the first PMI, the fourth joint index is an index jointly generated based on the second PMI and the RI, the first PMI indicates an index of a codeword in a first dimension in W1, and the second PMI indicates an index of a codeword in a second dimension in W1. The apparatus also includes a sending unit, configured to send the first CSI.

In the embodiments of the present invention, the CSI measurement and feedback method and apparatus are provided. In this solution, the terminal receives the reference signal sent by the base station, and the terminal performs channel measurement based on the reference signal, to obtain the first CSI carrying the target index. The target index is the first joint index, and the first joint index is the index jointly generated based on the first precoding matrix indicator PMI and the second PMI; or the target index is the second joint index, and the second joint index is the index jointly generated based on the rank indicator RI, the first PMI, and the second PMI; or the target index is the first PMI and the second PMI; or the target index is the third joint index and the second PMI, and the third joint index is the index jointly generated based on the first PMI and the RI; or the target index is the fourth joint index and the first PMI, the fourth joint index is the index jointly generated based on the second PMI and the RI, the first PMI indicates the index of the codeword in the first dimension in W1, and the second PMI indicates the index of the codeword in the second dimension in W1. The terminal sends the first CSI. This solution is specific to a scenario in which a 3D MIMO technology is used. Therefore, a disadvantage in the current technology that there is no CSI measurement and feedback method specific to the 3D MIMO technology is resolved.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1A:
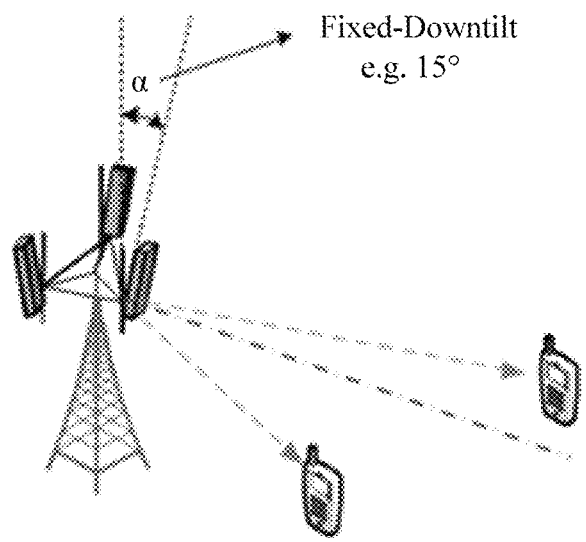
FIG. 1A is a schematic diagram of a 1D antenna in a current technology.
Figure 1B:
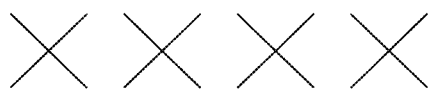
FIG. 1B is another schematic diagram of a 1D antenna in a current technology.
Figure 1C:
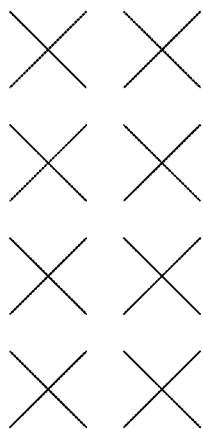
FIG. 1C is a schematic diagram of a 2D antenna in a current technology.
Figure 1D:
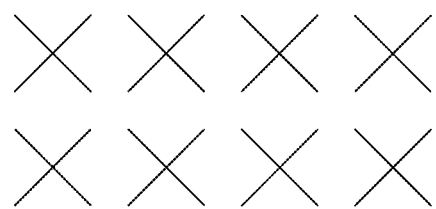
FIG. 1D is another schematic diagram of a 2D antenna in a current technology.
Figure 1E:
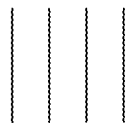
FIG. 1E is another schematic diagram of a 2D antenna in a current technology.
Figure 1E:
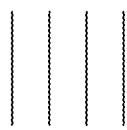
Figure 1E:
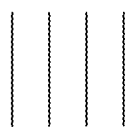
Figure 1E:
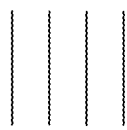

To make the objectives, technical solutions, and advantages of the present invention clearer, the following further describes the present invention in detail with reference to the accompanying drawings. Apparently, the described embodiments are merely some rather than all of the embodiments of the present invention. All other embodiments obtained by persons of ordinary skill in the art based on the embodiments of the present invention without creative efforts shall fall within the protection scope of the present invention.

Referring to FIG. 2, an embodiment of the present invention provides a CSI measurement and feedback method. A specific procedure is as follows.

Step 200: A terminal receives a reference signal sent by a base station.

Step 210: The terminal performs channel measurement based on the reference signal, to obtain first CSI carrying a target index. The target index is a first joint index, and the first joint index is an index jointly generated based on a first PMI and a second PMI; or the target index is a second joint index, and the second joint index is an index jointly generated based on an RI (Rank indicator), the first PMI, and the second PMI; or the target index is the first PMI and the second PMI; or the target index is a third joint index and the second PMI, and the third joint index is an index jointly generated based on the first PMI and the RI; or the target index is a fourth joint index and the first PMI, the fourth joint index is an index jointly generated based on the second PMI and the RI, the first PMI indicates an index of a codeword in a first dimension in W1, and the second PMI indicates an index of a codeword in a second dimension in W1.

Step 220: The terminal sends the first CSI.

In this embodiment of the present invention, W1 meets the following rule:

$W = W1 * W2$, and $$W = W1 * W2, W_1(i_{1,1}, i_{1,2}) = \begin{bmatrix} \tilde{X}_1^{i_{1,1}} \otimes \tilde{X}_2^{i_{1,2}} & 0 \\ 0 & \tilde{X}_1^{i_{1,1}} \otimes \tilde{X}_2^{i_{1,2}} \end{bmatrix},$$

where W is a precoding matrix; $\tilde{X}_1^{i_{1,1}}$ is a codeword in the first dimension, and a quantity of columns of $\tilde{X}_1^{i_{1,1}}$ is a quantity $N_1$ of antenna ports in the first dimension; $\tilde{X}_2^{i_{1,2}}$ is a codeword in the second dimension, and a quantity of columns of $\tilde{X}_2^{i_{1,2}}$ is a quantity $N_2$ of antenna ports in the second dimension; $i_{1,1}$ is an index of the codeword in the first dimension, and $i_{1,2}$ is an index of the codeword in the second dimension; W2 corresponds to a third PMI; $\otimes$ is a Kronecker product; $\tilde{X}_1^{i_{1,1}}$ includes discrete Fourier transform DFT column vectors, a form of the column vector included in $\tilde{X}_1^{i_{1,1}}$ is $v_{m_1}$, and $v_{m_1}$ meets the following rule:

$$v_{m_1} = \begin{bmatrix} 1 & e^{j\frac{2\pi m_1}{O_1 N_1}} & \ldots & e^{j\frac{2\pi m_1(N_1-1)}{O_1 N_1}} \end{bmatrix}^t, 0 \le m_1 \le N_1 \cdot O_1 - 1,,$$

where $O_1$ is an over-sampling factor in the first dimension; and a form of a column vector included in $\tilde{X}_2^{i_{1,2}}$ is $v_{m_2}$, and $v_{m_2}$ meets the following rule:

$$u_{m_2} = \begin{bmatrix} 1 & e^{j\frac{2\pi m_2}{O_2 N_2}} & \ldots & e^{j\frac{2\pi m_2(N_2-1)}{O_2 N_2}} \end{bmatrix}^t, 0 \le m_2 \le N_2 \cdot O_2 - 1,$$

where $O_2$ is an over-sampling factor in the second dimension.

In this embodiment of the present invention, the first PMI is related or unrelated to the second PMI. That the first PMI is related to the second PMI may be described as that a functional relationship exists between the first PMI and the second PMI, and that the first PMI is unrelated to the second PMI may be described as that no functional relationship exists between the first PMI and the second PMI.

Likewise, the third joint index is related or unrelated to the second PMI, or the fourth joint index is related or unrelated to the first PMI. The foregoing descriptions may also be used. Details are not described one by one herein again.

In this embodiment of the present invention, optionally, a set of codewords in the first dimension in W1 that are corresponding to at least M different first PMIs existing in all first PMIs is different from a set of codewords in the second dimension in W1 that are corresponding to second PMIs, where a Kronecker product is performed on the codeword in the first dimension and the codeword in the second dimension; or a set of codewords in the second dimension in W1 that are corresponding to at least M different second PMIs existing in all second PMIs is different from a set of codewords in the first dimension in W1 that are corresponding to first PMIs, where a Kronecker product is performed on the codeword in the first dimension and the codeword in the second dimension.

M is an integer greater than or equal to 2.

In this embodiment of the present invention, optionally, M is related to the over-sampling factor $O_1$ in the first dimension and/or the quantity $N_1$ of antennas in the first dimension, or M is equal to a total quantity of all states of the first PMI.

For example, when a quantity of bits of the first PMI is 2, all states of the first PMI is 4; when a quantity of bits of the first PMI is 3, all states of the first PMI is 8; or when a quantity of bits of the first PMI is 4, all states of the first PMI is 16.

Alternatively, M is related to the over-sampling factor $O_2$ in the second dimension and/or the quantity $N_2$ of antennas in the second dimension, or M is equal to a total quantity of all states of the second PMI.

For example, when a quantity of bits of the second PMI is 2, all states of the second PMI is 4; when a quantity of bits of the second PMI is 3, all states of the second PMI is 8; or when a quantity of bits of the second PMI is 4, all states of the second PMI is 16.

In this embodiment of the present invention, optionally, if the first target index I1 is the first joint index, an index of a codeword corresponding to the first PMI is $I1*Q_1$, and an index of a codeword corresponding to the second PMI is $I1*Q_2$. $Q_1$ and $Q_2$ are integers greater than or equal to 1, as shown in FIG. 2B.

Figure 2A:
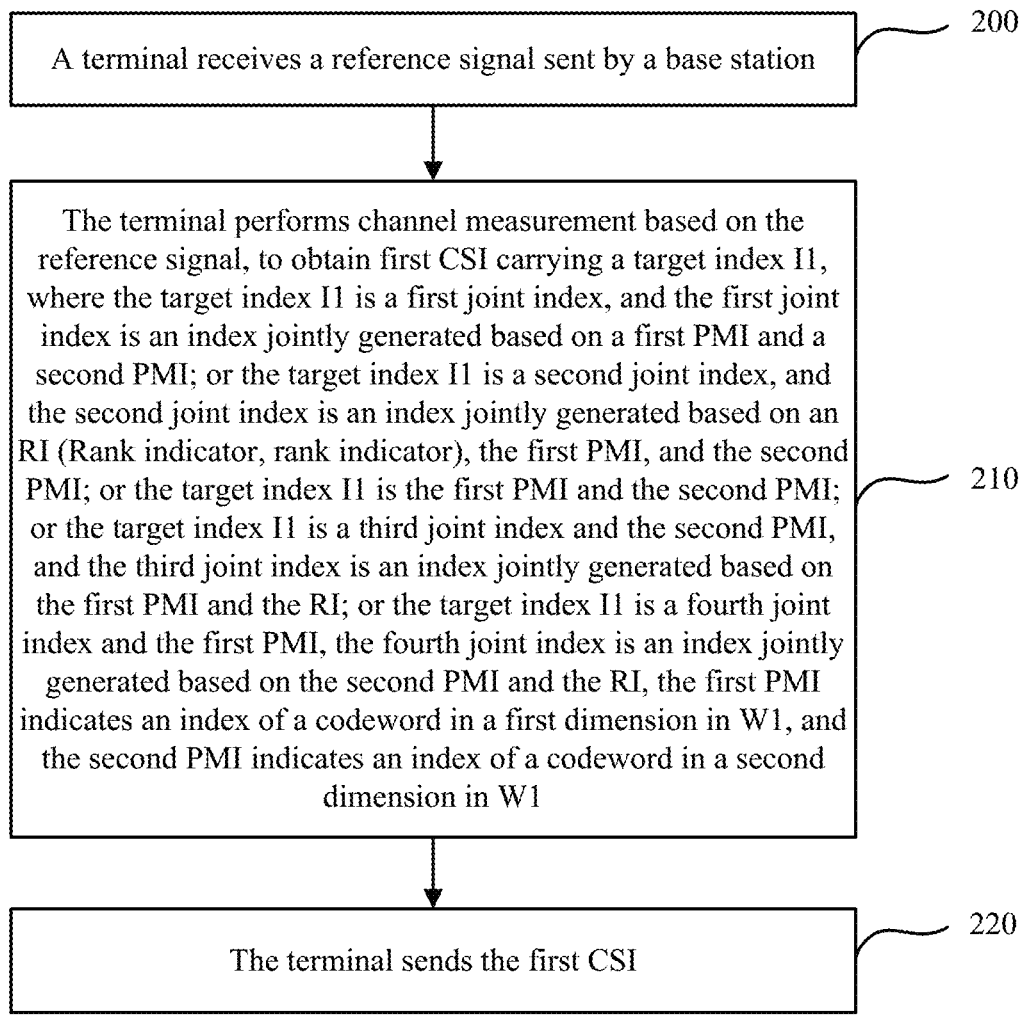
FIG. 2A is a schematic diagram of measuring and feeding back CSI according to an embodiment of the present invention.
Figure 2B:
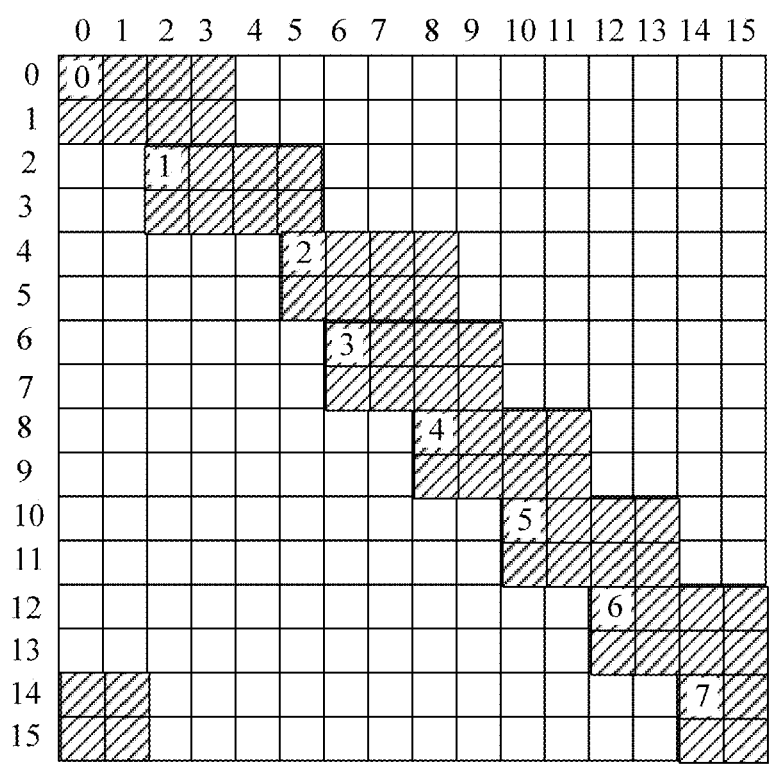
FIG. 2B is a schematic diagram of a target index according to an embodiment of the present invention.

Correspondingly, in FIG. 2B, $N_1=2$, $N_2=2$, $O_1=8$, and $O_2=8$. N1 and N2 are respectively the quantities of antennas in the first dimension and the second dimension. O1 and O2 are respectively the over-sampling factors in the first dimension and the second dimension. A total quantity of DFT vectors in the first dimension is $N_1*O_1$, and a total quantity of DFT vectors in the second dimension is $N_2*O_2$.

Column numbers 0 to 15 indicate numbers of DFT vector sets included in all codewords $\tilde{X}_1^{i1,1}$ in the first dimension, and row numbers 0 to 15 indicate numbers of DFT vector sets included in all codewords $\tilde{X}_2^{i1,2}$ in the second dimension.

A number in a shadow grid in the figure indicates a number for jointly indexing the first PMI and the second PMI. Numbers of DFT vectors included in codewords that are corresponding to the first PMI and that are corresponding to the number for joint indexing are four columns corresponding to eight grids in the upper left corner of the number that are of four columns and two rows. Numbers of DFT vectors included in codewords that correspond to the second PMI and that are corresponding to the number for joint indexing are the two rows corresponding to the eight grids in the upper left corner of the number that are of the four columns and the two rows.

A relationship between an index of a codeword corresponding to the first PMI and an index of a DFT vector, of a smallest number, included in a smallest codeword of the first PMI is $i/S_1$. $S_1$ is $S_1$ in FIG. 6.

For example, an index of DFT vectors included in the codeword corresponding to the first PMI is (4,5,6,7). In this case, when $S_1$ is 1, a number of the codeword of the first PMI is 4 obtained by dividing a DFT vector 4 of the smallest number by $S_1$. When $S_1=2$, the number of the codeword of the first PMI is 2.

A number of the codeword corresponding to the second PMI is obtained in a way similar to the foregoing one, and details are not described again.

A row quantity and a column quantity in another figure indicate the same meanings, and details are not described again.

In this embodiment of the present invention, optionally, $Q_1$ is related to a total quantity of antennas in the first dimension and/or the over-sampling factor in the first dimension, and $Q_2$ is related to a total quantity of antennas in the second dimension and/or the over-sampling factor in the second dimension.

In this embodiment of the present invention, optionally, $Q_1=Q_2=1$, or $Q_1=Q_2=2$, or $Q_1=Q_2=4$.

In this embodiment of the present invention, optionally, the method is applicable to a scenario of $N_1=N_2$ or a scenario of $N_1*Q_1=N2*Q_2$, $N_1$ is the total quantity of antennas in the first dimension, $N_2$ is the total quantity of antennas in the second dimension, $Q_1$ is the over-sampling factor in the first dimension, and $Q_2$ is the over-sampling factor in the second dimension.

In this embodiment of the present invention, optionally, if the first target index I1 is the first joint index, an index of a codeword corresponding to the first PMI is floor(I1 mod Q5)*Q6/S2 or ceil(I1 mod Q5)*Q6/S2, and an index of a codeword corresponding to the second PMI is floor (I1/Q5)*Q7 or ceil(I1/Q5)*Q7; or an index of a codeword corresponding to the second PMI is floor(I1 mod Q5)*Q6/S2 or ceil(I1 mod Q5)*Q6/S2, and an index of a codeword corresponding to the first PMI is floor(I1/Q5)*Q7 or ceil(I1/Q5)*Q7.

Figure 2C:
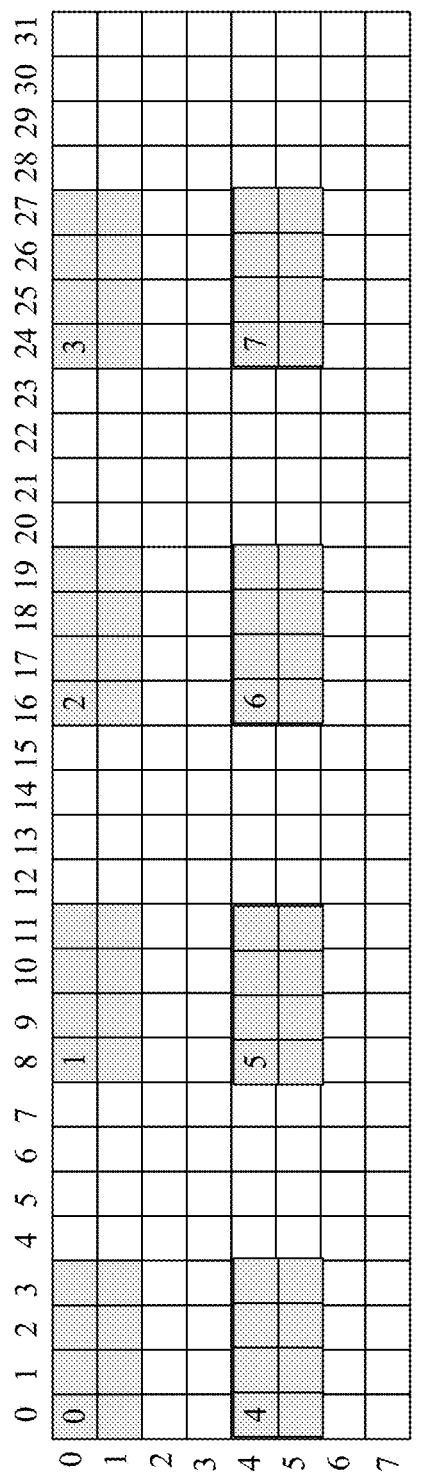
FIG. 2C is a schematic diagram of a target index according to an embodiment of the present invention.

Q7=floor($N_2*O_2$/S3) or Q7=ceil($N_2*O_2$/S3), Q6=floor($N_1*O_1$/Q5) or Q6=ceil($N_1*O_1$/Q5), and Q5, Q6, Q7, S2, and S3 are positive integers, as shown in FIG. 2C.

Figure 2D:
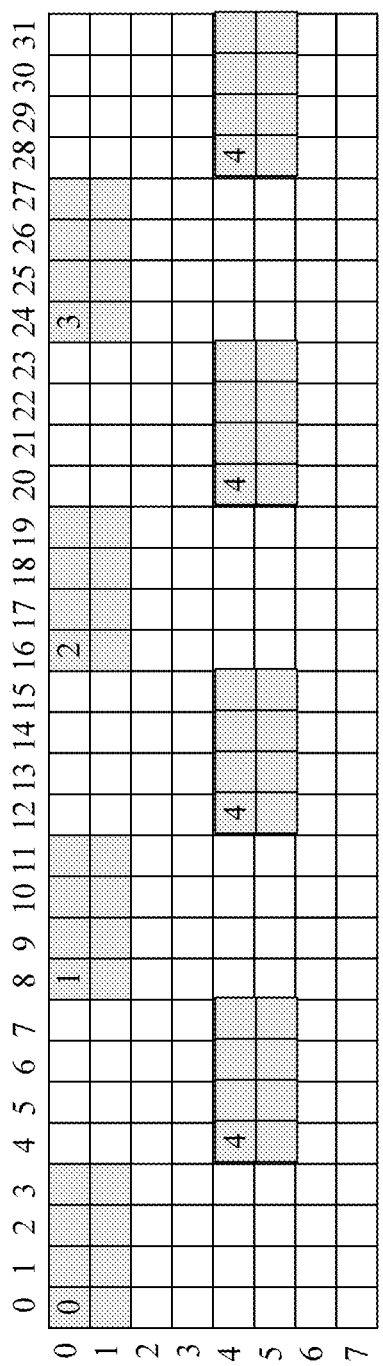
FIG. 2D is a schematic diagram of a target index according to an embodiment of the present invention.

In this embodiment of the present invention, optionally, an index of a codeword corresponding to the first PMI is floor(I1/Q5)*Q6/S1+floor(I1 mod Q5)*Q6/S2, ceil(I1/Q5)*Q6/S1+ceil(I1 mod Q5)*Q6/S2, floor(I1/Q5)*Q6/S1+ceil (I1 mod Q5)*Q6/S2, or ceil(I1/Q5)*Q6/S1+floor(I1 mod Q5)*Q6/S2; and an index of a codeword corresponding to the second PMI is floor(I1/Q5)*Q7 or ceil(I1/Q5)*Q7, where Q7=floor($N_2*O_2$/S3) or Q7=ceil($N_2*O_2$/S3), Q6=floor($N_1*O_1$/Q5) or Q6=ceil($N_1*O_1$/Q5), and Q5, Q6, Q7, S1, S2, and S3 are positive integers, as shown in FIG. 2D; or an index of a codeword corresponding to the second PMI is floor(I1/Q5)*Q6/S1+floor(I1 mod Q5)*Q6/S2, ceil (I1/Q5)*Q6/S1+ceil(I1 mod Q5)*Q6/S2, floor(I1/Q5)*Q6/S1+ceil(I1 mod Q5)*Q6/S2, or ceil(I1/Q5)*Q6/S1+floor(I1 mod Q5)*Q6/S2; and an index of a codeword corresponding to the first PMI is floor(I1/Q5)*Q7 or ceil(I1/Q5)*Q7.

Q7=floor($N_1*O_1$/S3) or Q7=ceil($N_1*O_1$/S3), Q6=floor($N_2*O_2$/Q5) or Q6=ceil($N_2*O_2$/Q5), and Q5, Q6, Q7, S2, and S3 are positive integers. In this embodiment, Q5=4, N1=4, N2=2, O1=8, O2=4, S3=2, and S1=2.

In this embodiment of the present invention, optionally, the index of the codeword corresponding to the first PMI is $i_{1,1}$, and the index of the codeword corresponding to the second PMI is $i_{1,2}$; and in this case, $$i_{1,d_1} = \left\lfloor \frac{I_1}{Q5} \right\rfloor \times \frac{N_{d_1} O_{d_1}}{2Q5S2} + \mathrm{mod}(I_1, Q5) \times \frac{N_{d_1} O_{d_1}}{Q5 s_1},$$

$$i_{1,d_2} = \left\lfloor \frac{I_1}{Q5} \right\rfloor \times \frac{N_{d_2} O_{d_2}}{2S2},$$

$$(d_1, d_2) = \begin{cases} (1,2) & \text{if } N_1 \geq N_2 \\ (2,1) & \text{others} \end{cases}, \text{ and}$$

$$Q5 = \begin{cases} 4 & \text{for } N_{d_1} = 4/2 \\ 3 & \text{for } N_{d_1} = 3 \\ 8 & \text{for } N_{d_1} = 8 \end{cases}.$$

Figure 2E:
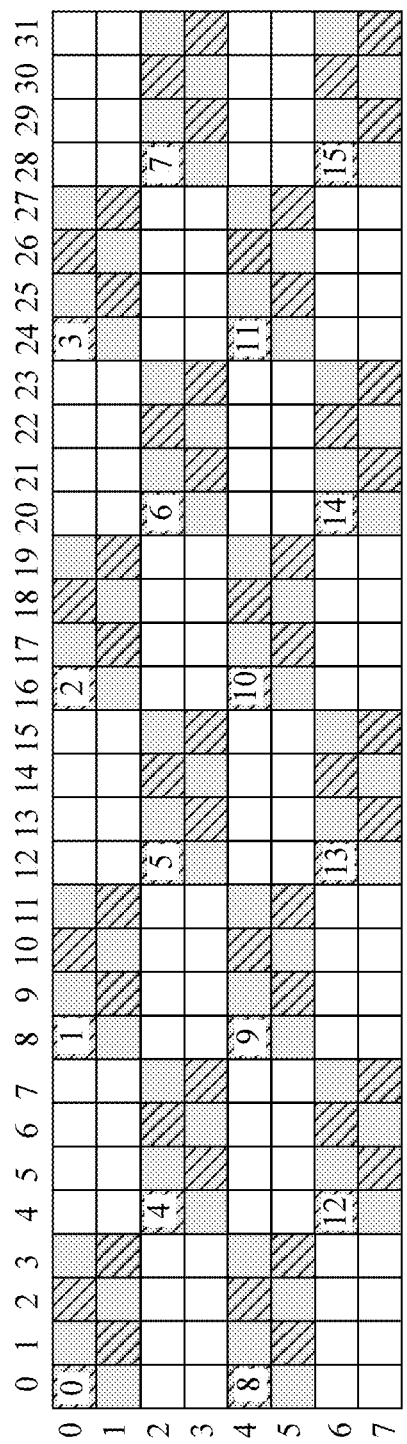
FIG. 2E is a schematic diagram of a target index according to an embodiment of the present invention.

In this embodiment of the present invention, optionally, an index of a codeword corresponding to the first PMI is floor(($I_1$/Q5) mod 2)*Q6/S1+floor(I1 mod Q5)*Q6/S2, or an index of a codeword corresponding to the first PMI is floor(($I_1$/Q5) mod 2)*Q6/S1+ceil(I1 mod Q5)*Q6/S2, or an index of a codeword corresponding to the first PMI is ceil(($I_1$/Q5) mod 2)*Q6/S1+ceil(I1 mod Q5)*Q6/S2, or an index of a codeword corresponding to the first PMI is ceil(($I_1$/Q5) mod 2)*Q6/S1+floor(I1 mod Q5)*Q6/S2; and an index of a codeword corresponding to the second PMI is ceil(I1/Q5)*Q7, or an index of a codeword corresponding to the second PMI is floor(I1/Q5)*Q7, where Q7=floor($N_2$*$O_2$/S3) or Q7=ceil($N_2$*$O_2$/S3), Q6=floor($N_1$*$O_1$/Q5) or Q6=ceil($N_1$*$O_1$/Q5), and I1/Q5 is floor(I1/Q5) or ceil(I1/Q5), as shown in FIG. 2E; or an index of a codeword corresponding to the second PMI is floor((I1/Q5) mod 2)*Q6/S1+floor(I1 mod Q5)*Q6/S2, or an index of a codeword corresponding to the second PMI is floor((I1/Q5) mod 2)*Q6/S1+ceil(I1 mod Q5)*Q6/S2, or an index of a codeword corresponding to the second PMI is ceil((I1/Q5) mod 2)*Q6/S1+ceil(I1 mod Q5)*Q6/S2, or an index of a codeword corresponding to the second PMI is ceil(($I_1$/Q5) mod 2)*Q6/S1+floor(I1 mod Q5)*Q6/S2; and an index of a codeword corresponding to the first PMI is ceil(I1/Q5)*Q7, or an index of a codeword corresponding to the first PMI is floor(I1/Q5)*Q7, where Q7=floor($N_1$*$O_1$/S3) or Q7=ceil($N_1$*$O_1$/S3), Q6=floor($N_2$*$O_2$/Q5) or Q6=ceil($N_2$*$O_2$/Q5), and I1/Q5 is floor(I1/Q5) or ceil(I1/Q5).

Figure 2F:
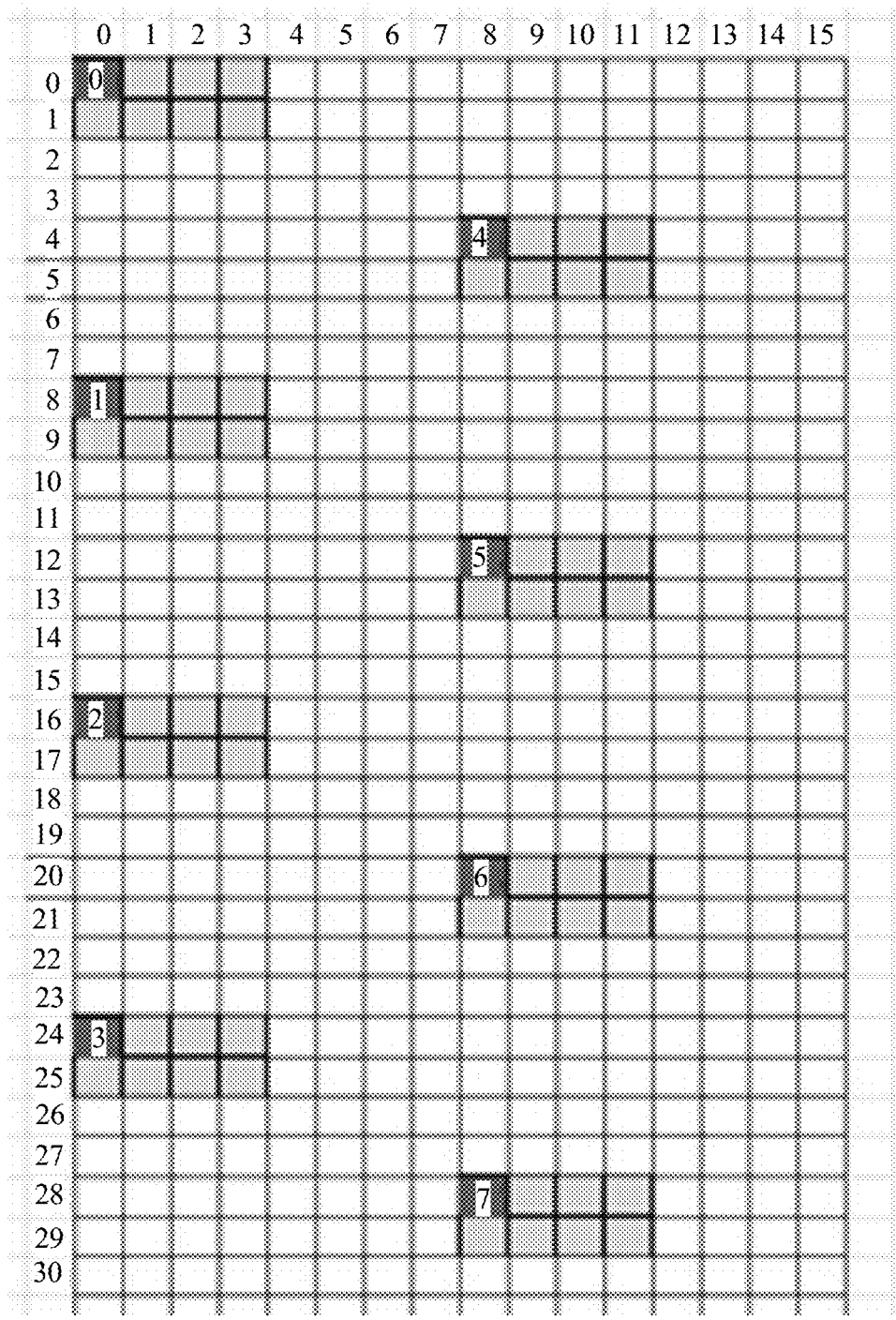
FIG. 2F is a schematic diagram of a target index according to an embodiment of the present invention.

In this embodiment of the present invention, optionally, an index of a codeword corresponding to the first PMI is floor(I1/Q5)*Q6/S1 or ceil(I1/Q5)*Q6/S1, and an index of a codeword corresponding to the second PMI is floor((I1/Q5)*Q6/S1)+ceil(I1 mod Q5)*Q6/S2), floor(($I_1$/Q5)*Q6/S1)+floor(I1 mod Q5)*Q6/S2), ceil(($I_1$/Q5)*Q6/S1)+floor(I1 mod Q5)*Q6/S2), or ceil(($I_1$/Q5)*Q6/S1)+ceil(I1 mod Q5)*Q6/S2), as shown in FIG. 2F; or an index of a codeword corresponding to the second PMI is floor(I1/Q5)*Q6/S1 or ceil(I1/Q5)*Q6/S1, and an index of a codeword corresponding to the first PMI is floor(($I_1$/Q5)*Q6/S1)+ceil(I1 mod Q5)*Q6/S2), floor(($I_1$/Q5)*Q6/S1)+floor(I1 mod Q5)*Q6/S2), ceil(($I_1$/Q5)*Q6/S1)+floor(I1 mod Q5)*Q6/S2), or ceil(($I_1$/Q5)*Q6/S1)+ceil(I1 mod Q5)*Q6/S2), where Q6=floor(N1*$Q_1$/Q5) or ceil(N1*$Q_1$/Q5). As an embodiment, where an index of a codeword corresponding to the first PMI is I1*Q6/S2, and an index of a codeword corresponding to the second PMI is I1.

In this embodiment of the present invention, optionally, S2=8.

Figure 2G:
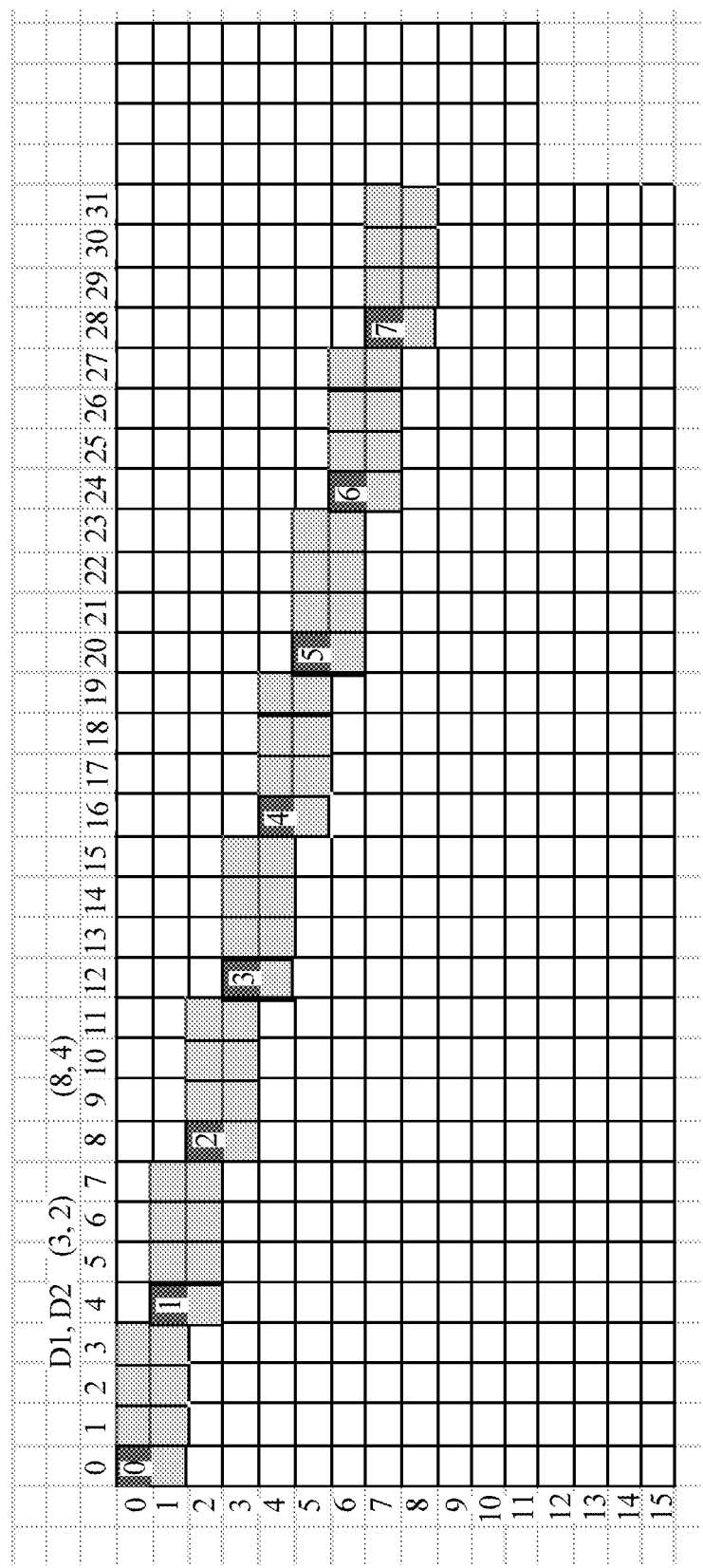
FIG. 2G is a schematic diagram of a target index according to an embodiment of the present invention.

In this embodiment of the present invention, optionally, an index of a codeword corresponding to the first PMI is floor(I1*Q4) or ceil(I1*Q4), and an index of a codeword corresponding to the second PMI is floor(I1 mod Q5)*Q7 or ceil(I1 mod Q5)*Q7; or an index of a codeword corresponding to the second PMI is floor(I1*Q4) or ceil(I1*Q4), and an index of a codeword corresponding to the first PMI is floor(I1 mod Q5)*Q7 or ceil(I1 mod Q5)*Q7, as shown in FIG. 2G.

In this embodiment of the present invention, optionally, Q7=1.

Figure 2H:
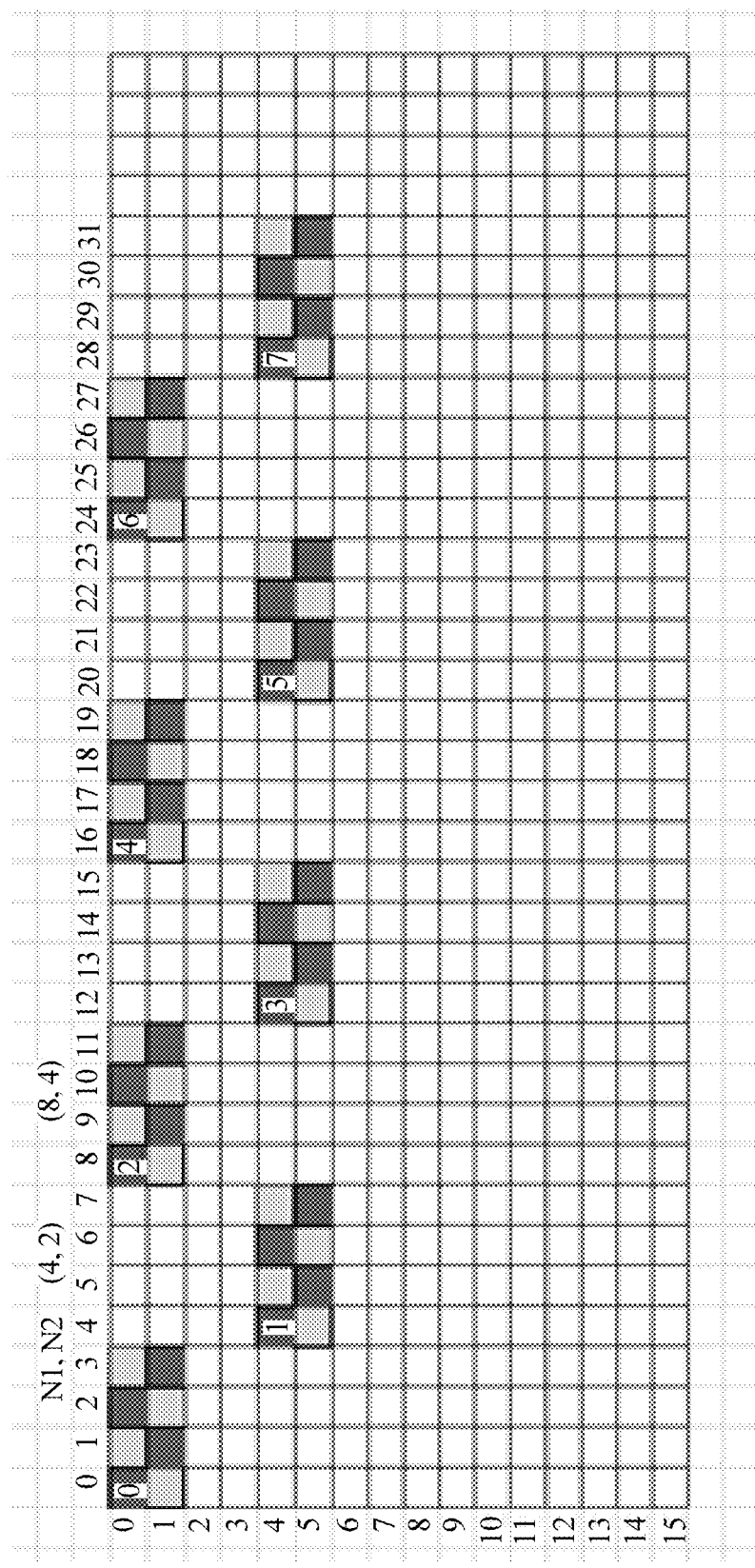
FIG. 2H is a schematic diagram of a target index according to an embodiment of the present invention.

In this embodiment of the present invention, optionally, an index of a codeword corresponding to the first PMI is floor(I1*Q6/S2) or ceil(I1*Q6/S2), and an index of a codeword corresponding to the second PMI is floor(I1 mod Q8)*Q7 or ceil(I1 mod Q8)*Q7, where Q7=floor($N_2$*$O_2$/S3) or Q7=ceil($N_2$*$O_2$/S3), and Q6=floor($N_1$*$O_1$/Q5) or Q6=ceil($N_1$*$O_1$/Q5); or an index of a codeword corresponding to the second PMI is floor(I1*Q6/S2) or ceil(I1*Q6/S2), and an index of a codeword corresponding to the first PMI is floor(I1 mod Q8)*Q7 or ceil(I1 mod Q8)*Q7, where Q7=floor($N_1$*$O_1$/S3) or Q7=ceil($N_1$*$O_1$/S3), and Q6=floor($N_2$*$O_2$/Q5) or Q6=ceil($N_2$*$O_2$/Q5), as shown in FIG. 2H.

In this embodiment of the present invention, optionally, S3=2 or S3=4.

In this embodiment of the present invention, optionally, an index of a codeword corresponding to the second PMI is floor(Q7*I1,2) or ceil(Q7*I1,2), and an index of a codeword corresponding to the first PMI is floor(Q8*I1,2+i1,1*Q5) or ceil(Q8*I1,2+i1,1*Q5); or an index of a codeword corresponding to the first PMI is floor(Q7*I1,2) or ceil(Q7*I1,2), and an index of a codeword corresponding to the second PMI is floor(Q8*I1,2+i1,1*Q5) or ceil(Q8*I1,2+i1,1*Q5), as shown in FIG. 2H.

In this embodiment of the present invention, optionally, the fourth joint index $I_{RI//second\ PMI}$ and the second PMI I1,2 have the following correspondence and meet the following rule:

| $I_{RI//second\ PMI}$ | RI | I1,2 |
|---|---|---|
| 0 to Y0 | 1 | $I_{RI//second\ PMI}$ |
| Y0 + 1 to Y1 | 2 | $I_{RI//second\ PMI}$-Y0-1 |
| Y1 + 1 to Y2 | 3 | $I_{RI//second\ PMI}$-Y1-1 |
| Y2 + 1 to Y3 | 4 | $I_{RI//second\ PMI}$-Y2-1 |

In this embodiment of the present invention, optionally, the first joint index I1 and the second joint index $I_{RI/first\ PMI/second\ PMI}$ meet the following rule:

| $I_{RI/first\ PMI/second\ PMI}$ | RI | I1 |
|---|---|---|
| 0 to Y0 | 1 | $I_{RI/first\ PMI/second\ PMI}$ |
| Y0 + 1 to Y1 | 2 | $I_{RI/first\ PMI/second\ PMI}$-(Y0 + 1) |
| Y1 + 1 to Y2 | 3 | $I_{RI/first\ PMI/second\ PMI}$-(Y1 + 1) |
| Y2 + 1 to Y3 | 4 | $I_{RI/first\ PMI/second\ PMI}$-(Y2 + 1) |

Y0 + 1 is $I_{RI/first\ PMI/total\ quantity\ of\ all\ states\ of\ the\ second\ PMI}$ when a rank is 1;
Y1 + 1 is $I_{RI/first\ PMI/total\ quantity\ of\ all\ states\ of\ the\ second\ PMI}$ when the rank is 2;
Y2 + 1 is $I_{RI/first\ PMI/total\ quantity\ of\ all\ states\ of\ the\ second\ PMI}$ when the rank is 3; and
Y3 + 1 is $I_{RI/first\ PMI/total\ quantity\ of\ all\ states\ of\ the\ second\ PMI}$ when the rank is 4.

In this embodiment of the present invention, optionally, when the rank is 1, Codebook-Subset-SelectionConfig is a configuration 1, and when the third PMI is 2 bits, serial numbers of codewords that are of W2 and that are corresponding to the third PMI are 0 to 3; or when the third PMI is 1 bit, used serial numbers of codewords are 0 and 2; or when Codebook-Subset-SelectionConfig is a configuration 2, and the third PMI is 2 bits, serial numbers of codewords that are of W2 and that are corresponding to the third PMI are 0, 2, 20, and 22, or 1, 3, 21, and 23, or 0 to 3, or 4, 6, 16, and 18, or 5, 7, 17, and 19, or 0, 2, 4, and 6, or 16, 18, 20, and 22, or 1, 3, 5, and 7, or 17, 19, 21, and 23; or when Codebook-Subset-SelectionConfig is a configuration 3, and the third PMI is 2 bits, serial numbers of codewords that are of W2 and that are corresponding to the third PMI are 0, 2, 28, and 30, or 1, 3, 29, and 31, or 0 to 3, or 0, 2, 8, and to, or 1, 3, 9, and 11, or 0, 2, 20, and 22, or 1, 3, 21, and 23; or when Codebook-Subset-SelectionConfig is a configuration 4, and the third PMI is 2 bits, codewords of W2 that are corresponding to the third PMI are 0, 2, 8, and to, or 1, 3, 9, and 11, where the codewords of W2 are:

$$W_2 \in C_2 = \left\{ \frac{1}{\sqrt{x}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\}$$

$$Y \in \{\tilde{e}_1, \tilde{e}_2, \tilde{e}_3, \tilde{e}_4 \tilde{e}_5, \tilde{e}_6, \tilde{e}_7, \tilde{e}_2\},$$

where four states $$\frac{1}{\sqrt{x}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix}$$

corresponding to a number $\tilde{e}_1$ of a codeword corresponding to W2 are numbered from 0 to 3, four states of $\tilde{e}_2$ are then sequentially numbered from 4 to 7, four states of $\tilde{e}^3$ are numbered from 8 to 11, four states of $\tilde{e}_4$ are numbered from 12 to 15, four states of $\tilde{e}_5$ are numbered from 16 to 19, four states of $\tilde{e}_6$ are numbered from 20 to 23, four states of $\tilde{e}^7$ are numbered from 24 to 27, and four states of $\tilde{e}_8$ are numbered from 28 to 31, where x is a parameter related to a quantity of antenna ports.

In this embodiment of the present invention, optionally, S1=2 or 3 or S1=4; or

S2=1 or S2=2 or 3;

Q5=2, 3, 4, 6 or 8 or 83=2, 3, 4, or 8; and

Q5, Q6, and Q7 are related to N1, N2, O1, and O2 and/or related to quantities of bits of the first PMI and the second PMI; or Q5, Q6, and Q7 are related to a feedback mode or related to a configuration mode.

In this embodiment of the present invention, optionally, S2 and S3 are related to codebook subset selection configuration information and/or the quantity of antenna ports and/or an over-sampling factor.

When Codebook-Subset-SelectionConfig is the configuration 1, S2=1, and when Codebook-Subset-SelectionConfig is the configurations 2 to 4, S2=2; or when Codebook-Subset-SelectionConfig is the configuration 1, S2=2, and when Codebook-Subset-SelectionConfig is the configurations 2 to 4, S2=4; or when Codebook-Subset-SelectionConfig is the configuration 1, S3=1, and when Codebook-Subset-SelectionConfig is the configurations 2 to 4, S3=2; or when Codebook-Subset-SelectionConfig is the configuration 1, S3=2, and when Codebook-Subset-SelectionConfig is the configurations 2 to 4, S3=4.

In this embodiment of the present invention, optionally, Q5=2, 3, 4, 6, or 8, and S1=2 or S1=4, or S3=2, 4, or 8.

When Codebook-Subset-SelectionConfig is the configuration 1, S2=1, and when Codebook-Subset-SelectionConfig is the configurations 2 to 4, S2=2; or when Codebook-Subset-SelectionConfig is the configuration 1, 83=2, and when Codebook-Subset-SelectionConfig is the configurations 2 to 4, S3=4.

Figure 6:
FIG. 6 is a table of configuration information of Codebook-Subset-SelectionConfig.
Figure 6:
Figure 6:
Figure 6:

Codebook-Subset-SelectionConfig is configuration information for performing subset restriction on a codeword of W2. As shown in FIG. 6, there are four configurations in total in FIG. 6. Eight grids in each configuration correspond to eight vectors obtained after performing a Kronecker product on codewords in two dimensions. Numbers 0 to 3 in a horizontal direction correspond to numbers of four DFT vectors in $\tilde{X}_1^{i_{1,1}}$ and numbers 0 to 2 in a vertical direction correspond to numbers of two DFT vectors in $\tilde{X}_2^{i_{1,2}}$. $S_1$ indicates a quantity of DFT vectors that stagger two codewords of adjacent numbers in $\tilde{X}_1^{i_{1,1}}$, and $S_2$ indicates a quantity of DFT vectors that stagger two codewords of adjacent numbers in $\tilde{X}_2^{i_{1,2}}$.

Optionally, the first CSI is CSI corresponding to a CSI process, and includes at least two of a first CSI reporting type, a second CSI reporting type, a third CSI reporting type, or a fourth CSI reporting type.

The reporting types are CSI content reported at a same moment.

The first CSI reporting type includes a rank indicator RI, the second CSI reporting type includes a first broadband PMI and a second broadband PMI or an index jointly generated based on the first broadband PMI and the second broadband PMI, the third CSI reporting type includes a third broadband PMI and a broadband channel quality indicator CQI, and the third broadband PMI indicates an index of a codebook included in W2; or the first CSI reporting type includes an RI and a first broadband PMI or an index jointly generated according to the RI and the first broadband PMI, the second CSI reporting type includes a second broadband PMI, and the third CSI reporting type includes a third broadband PMI and a broadband CQI; or the first CSI reporting type includes an RI and a second broadband PMI or a joint index of the RI and the second broadband PMI, the second CSI reporting type includes a first broadband PMI, and the third CSI reporting type includes a third broadband PMI and a broadband CQI; or the first CSI reporting type includes an RI and a fourth broadband PMI, the second CSI reporting type includes a fifth broadband PMI, the third CSI reporting type includes a third broadband PMI and a broadband CQI, the fourth broadband PMI is a minimum value of a first broadband PMI and a second broadband PMI, and the fifth broadband PMI is a maximum value of the first broadband PMI and the second broadband PMI; or the first CSI reporting type includes an RI and a first broadband PMI or a joint index of the RI and the first broadband PMI, and the second CSI reporting type includes a second broadband PMI, a third broadband PMI, and a broadband CQI; or the first CSI reporting type includes an RI and a second broadband PMI or a joint index of the RI and the second broadband PMI, and the second CSI reporting type includes a first broadband PMI, a third broadband PMI, and a broadband CQI; or the first CSI reporting type includes an RI and a fourth broadband PMI, and the second CSI reporting type includes a fifth broadband PMI, a third broadband PMI, and a broadband CQI; or the first CSI reporting type includes an RI, the second CSI reporting type includes a first broadband PMI, the third CSI reporting type includes a second broadband PMI, and the fourth CSI includes a third broadband PMI and a CQI; or the first CSI reporting type includes an RI, the second CSI reporting type includes a first broadband PMI, and the third CSI reporting type includes a second broadband PMI, a third broadband PMI, and a broadband CQI; or the first CSI reporting type includes an RI, the second CSI reporting type includes an indication parameter of a codebook configuration manner, the third CSI reporting type includes a first broadband PMI and a second broadband PMI, and the codebook configuration indication parameter is used to indicate a codebook aggregation manner; or the first CSI reporting type includes an RI and an indication parameter of a configuration manner, and the second CSI reporting type includes a second broadband PMI, a third broadband PMI, and a broadband CQI.

The first CSI further includes the fourth CSI reporting type. The fourth CSI reporting type includes a third broadband PMI and a broadband CQI.

A first CSI reporting period is longer than a second CSI reporting period, and the second CSI reporting period is longer than a third CSI reporting period; or a first CSI reporting period is longer than a second CSI reporting period; or a first CSI reporting period is longer than a second CSI reporting period, the second CSI reporting period is longer than a third CSI reporting period, and the third CSI reporting period is longer than a fourth CSI reporting period.

The first CSI reporting period corresponds to the first CSI reporting type, the second CSI reporting period corresponds to the second CSI reporting type, and the third CSI reporting period corresponds to the third CSI reporting type.

Content included in the CSI reporting type is related to a Codebook-Subset-SelectionConfig manner.

Different states of a PTI indicate whether broadband reporting or subband reporting is used next to report the first PMI and the second PMI or whether the first PMI or the second PMI is reported next.

The first CSI is CSI corresponding to a CSI process, and includes at least three of a first CSI reporting type, a second CSI reporting type, a third CSI reporting type, a fourth CSI reporting type, a fifth CSI reporting type, a sixth CSI reporting type, or a seventh CSI reporting type.

The reporting types are CSI content reported at a same moment, and each reporting type corresponds to a reporting period.

The first CSI reporting type includes a PTI and an RI, the second CSI reporting type includes a first broadband PMI and a second broadband PMI or an index jointly generated based on the first broadband PMI and the second broadband PMI, the third CSI reporting type includes a third broadband PMI and a broadband channel quality indicator CQI, and the fourth CSI reporting type includes a third subband PMI and a subband CQI. When PTI=0, the second CSI reporting type and the third CSI reporting type are reported next; or when PTI=1, the second CSI reporting type and the fourth CSI reporting type are reported next.

Alternatively, the first CSI reporting type includes a PTI and an RI, the second CSI reporting type includes a first broadband PMI and a second broadband PMI or an index jointly generated based on the first broadband PMI and the second broadband PMI, the third CSI reporting type includes a third broadband PMI and a broadband channel quality indicator CQI, the fourth CSI reporting type includes a third subband PMI and a subband CQI, the fifth CSI reporting type includes the second broadband PMI and the third broadband PMI, and the sixth CSI reporting type includes the first broadband PMI and the third broadband PMI. When the PTI is in a first state, the second CSI reporting type and the third CSI reporting type are reported next; when the PTI is in a second state, the fifth CSI reporting type and the fourth CSI reporting type are reported next; or when the PTI is in a third state, the sixth CSI reporting type and the fourth CSI reporting type are reported next.

Alternatively, the first CSI reporting type includes a PTI and an RI, the second CSI reporting type includes a first broadband PMI and a second broadband PMI or an index jointly generated based on the first broadband PMI and the second broadband PMI, the third CSI reporting type includes a third broadband PMI and a broadband channel quality indicator CQI, the fourth CSI reporting type includes a third subband PMI and a subband CQI, the fifth CSI reporting type includes the first broadband PMI and a second subband PMI, the sixth CSI reporting type includes the second broadband PMI and the third subband PMI, and the seventh CSI reporting type includes the second subband PMI and the third subband PMI. When the PTI is in a first state, the second CSI reporting type and the third CSI reporting type are reported next; when the PTI is in a second state, the fifth CSI reporting type and the fourth CSI reporting type are reported next; when the PTI is in a third state, the sixth CSI reporting type and the fourth CSI reporting type are reported next; or when the PTI is in a fourth state, the seventh CSI reporting type and the fourth CSI reporting type are reported next.

That the terminal sends the first CSI includes the following.

The terminal periodically sends the first CSI.

The method further includes the following.

The terminal receives a reporting indication sent by the base station, and sends an RI, a CQI, and one of the first PMI and the second PMI based on the reporting indication at a non-periodical reporting moment.

A subframe interval between a subframe for sending the first CSI and a reference subframe corresponding to the subframe for sending the first CSI is related to an antenna configuration and/or an over-sampling factor.

The subframe interval is related to a quantity of codebooks included in a codebook restriction subset of W1, and the codebook restriction subset is a set of codebooks, in W1, that can be indicated by the first PMI and the second PMI.

The subframe interval is related to K.

The first CSI is specific to a first-type CSI process.

The method further includes the following:

The terminal obtains the second CSI, where the second CSI is specific to a second-type CSI process.

The terminal determines that the first CSI and the second CSI need to be sent in a same time unit, and sends only the first CSI when a priority of the first CSI is higher than a priority of the second CSI.

That the terminal determines that the priority of the first CSI is higher than the priority of the second CSI includes the following:

The terminal determines, according to at least one piece of the following information, that the priority of the first CSI is higher than the priority of the second CSI: a CSI reporting type, a carrier number of a carrier corresponding to CSI, a CSI process corresponding to the CSI, or an attribute of a reference signal corresponding to the CSI.

That the terminal determines, based on the attribute of the reference signal corresponding to the CSI, that the priority of the first CSI is higher than the priority of the second CSI includes the following.

If a reference signal corresponding to one piece of CSI of the first CSI and the second CSI is precoded and a reference signal corresponding to the other piece of CSI is not precoded, the terminal determines, based on an attribute of whether the reference signal corresponding to the CSI is precoded, that the priority of the first CSI is higher than the priority of the second CSI; or if reference signals respectively corresponding to the first CSI and the second CSI are both precoded, the terminal determines, according to attributes of sub-reference signals included in the precoded reference signals corresponding to the CSI, that the priority of the first CSI is higher than the priority of the second CSI.

The CSI reporting type corresponding to the first CSI is the same as or different from a CSI reporting type corresponding to the second CSI.

The first CSI further includes an RI and a CQI.

When a quantity of sub-reference signals included in the reference signal corresponding to the second CSI is greater than 1, the second CSI includes an index of a sub-reference signal resource, and an RI, a PMI, and a CQI that are of a sub-reference signal corresponding to the index; or when a quantity of sub-reference signals included in the reference signal corresponding to the second CSI is greater than 1, the second CSI includes an RI, a PMI, and a CQI.

A priority of the first-type CSI process is higher than a priority of the second-type CSI process.

The quantity of sub-reference signals included in the reference signal corresponding to the second CSI is greater than 1 (A>B1); or the quantity of sub-reference signals included in the reference signal corresponding to the second CSI is equal to 1 (A>B2).

The method further includes the following.

The terminal obtains the third CSI, where the third CSI is specific to the second-type CSI process.

If the quantity of sub-reference signals included in the reference signal corresponding to the second CSI is greater than 1, and a quantity of sub-reference signals included in a reference signal corresponding to the third CSI is equal to 1, the priority of the second CSI is higher than a priority of the third CSI; or if the quantity of sub-reference signals included in the reference signal corresponding to the second CSI is greater than 1, and a quantity of sub-reference signals included in a reference signal corresponding to the third CSI is equal to 1, a priority of the third CSI is higher than the priority of the second CSI.

The first CSI is specific to a second-type CSI process and the first-type CSI process.

The method further includes the following.

The terminal obtains the second CSI, where the second CSI is specific to a first-type CSI process and the second-type CSI process.

The terminal determines that the first CSI and the second CSI need to be sent in a same time unit, and sends only the first CSI when a priority of the first CSI is higher than a priority of the second CSI.

That the terminal determines that the priority of the first CSI is higher than the priority of the second CSI includes the following.

The terminal determines, according to at least one piece of the following information, that the priority of the first CSI is higher than the priority of the second CSI: a CSI reporting type, a carrier number of a carrier corresponding to CSI, a CSI process corresponding to the CSI, or an attribute of a reference signal corresponding to the CSI.

That the terminal determines, based on the attribute of the reference signal corresponding to the CSI, that the priority of the first CSI is higher than the priority of the second CSI includes the following.

If a reference signal corresponding to one piece of CSI of the first CSI and the second CSI is precoded and a reference signal corresponding to the other piece of CSI is not precoded, the terminal determines, based on an attribute of whether the reference signal corresponding to the CSI is precoded, that the priority of the first CSI is higher than the priority of the second CSI; or if reference signals respectively corresponding to the first CSI and the second CSI are both precoded, the terminal determines, according to attributes of sub-reference signals included in the precoded reference signals corresponding to the CSI, that the priority of the first CSI is higher than the priority of the second CSI.

The first CSI further includes an RI and a CQI.

When a quantity of sub-reference signals included in the reference signal corresponding to the second CSI is greater than 1, the second CSI includes an index of a sub-reference signal resource, and an RI, a PMI, and a CQI that are of a sub-reference signal corresponding to the index; or when a quantity of sub-reference signals included in the reference signal corresponding to the second CSI is greater than 1, the second CSI includes an RI, a PMI, and a CQI.

The CSI reporting type corresponding to the first CSI is the same as or different from a CSI reporting type corresponding to the second CSI.

A priority of the second-type CSI process is higher than a priority of the first-type CSI process.

The quantity of sub-reference signals included in the reference signal corresponding to the second CSI is greater than 1 (A<B1); or the quantity of sub-reference signals included in the reference signal corresponding to the second CSI is equal to 1 (A<B2).

The method further includes the following.

The terminal obtains the third CSI, where the third CSI is specific to the second-type CSI process.

If the quantity of sub-reference signals included in the reference signal corresponding to the second CSI is greater than 1, and a quantity of sub-reference signals included in a reference signal corresponding to the third CSI is equal to 1, the priority of the second CSI is higher than a priority of the third CSI, and the priority of the third CSI is higher than the priority of the first CSI (B2>B1>A); or if the quantity of sub-reference signals included in the reference signal corresponding to the second CSI is greater than 1, and a quantity of sub-reference signals included in a reference signal corresponding to the third CSI is equal to 1, a priority of the third CSI is higher than the priority of the second CSI, and the priority of the second CSI is higher than the priority of the first CSI (B1>B2>A).

The method further includes the following.

The terminal obtains the third CSI, where the third CSI is specific to the second-type CSI process.

If the quantity of sub-reference signals included in the reference signal corresponding to the second CSI is greater than 1, and a quantity of sub-reference signals included in a reference signal corresponding to the third CSI is equal to 1, the priority of the second CSI is higher than the priority of the first CSI, and the priority of the first CSI is higher than a priority of the third CSI (B2>A>B1); or if the quantity of sub-reference signals included in the reference signal corresponding to the second CSI is greater than 1, and a quantity of sub-reference signals included in a reference signal corresponding to the third CSI is equal to 1, a priority of the third CSI is higher than the priority of the first CSI, and the priority of the first CSI is higher than the priority of the third CSI (B1>A>B2).

The method further includes the following.

If the quantity of sub-reference signals included in the reference signal corresponding to the second CSI and a quantity of sub-reference signals included in a reference signal corresponding to the third CSI both are greater than 1, the second CSI includes an index of the sub-reference signal, and the third CSI does not include an index of the sub-reference signal, a priority of a reporting type corresponding to the second CSI is higher than a priority of a reporting type corresponding to the third CSI.

The method further includes the following.

If the quantity of sub-reference signals included in the reference signal corresponding to the second CSI is greater than 1, and a quantity of sub-reference signals included in a reference signal corresponding to the third CSI is equal to 1, the priority of the second CSI is higher than a priority of the third CSI.

The method further includes the following.

If the quantity of sub-reference signals included in the reference signal corresponding to the second CSI is greater than 1, and the second CSI includes an index of a sub-reference signal resource, the priority of the second CSI is higher than the priority of the first CSI.

Figure 3:
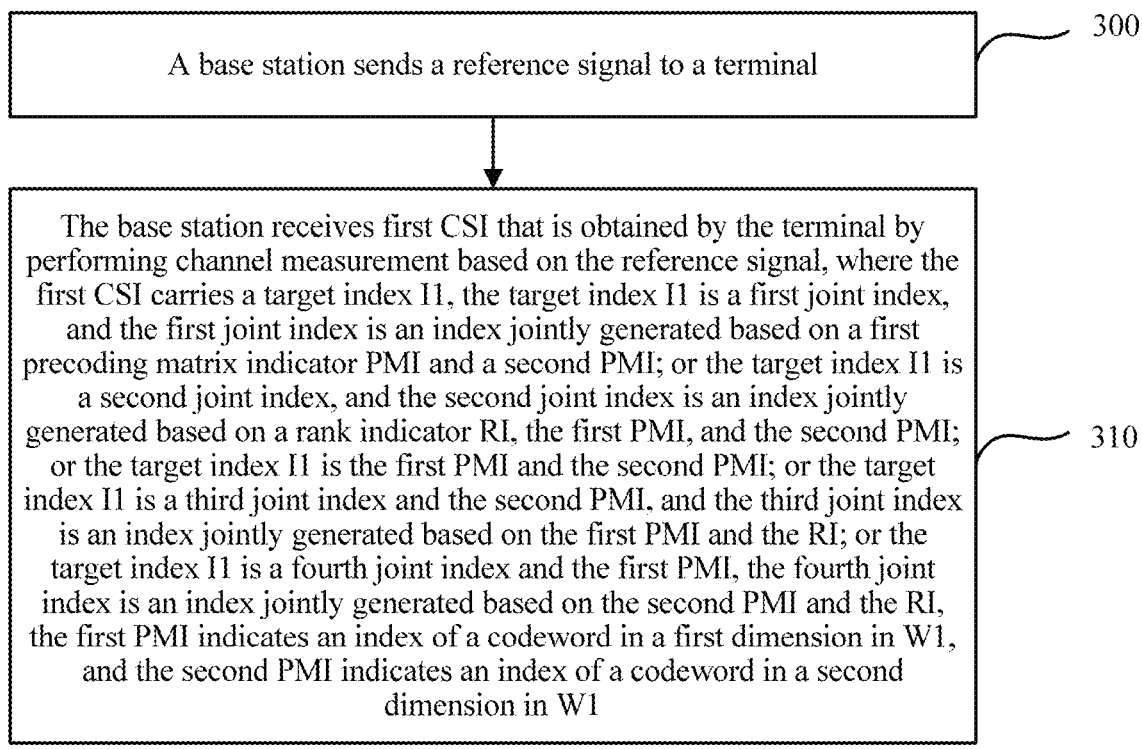
FIG. 3 is another schematic diagram of measuring and feeding back CSI according to an embodiment of the present invention.

Referring to FIG. 3, an embodiment of the present invention provides another CSI measurement and feedback method. A procedure is as follows.

Step 300: A base station sends a reference signal to a terminal.

Step 310: The base station receives first CSI that is obtained by the terminal by performing channel measurement based on the reference signal, where the first CSI carries a target index, the target index is a first joint index, and the first joint index is an index jointly generated based on a first precoding matrix indicator PMI and a second PMI; or the target index is a second joint index, and the second joint index is an index jointly generated based on a rank indicator RI, the first PMI, and the second PMI; or the target index is the first PMI and the second PMI; or the target index is a third joint index and the second PMI, and the third joint index is an index jointly generated based on the first PMI and the RI; or the target index is a fourth joint index and the first PMI, the fourth joint index is an index jointly generated based on the second PMI and the RI, the first PMI indicates an index of a codeword in a first dimension in W1, and the second PMI indicates an index of a codeword in a second dimension in W1.

In this embodiment of the present invention, W1 meets the following rule:

$$W = W1 * W2, \text{ and}$$

$$W = W1 * W2, W_1(i_{1,1}, i_{1,2}) = \begin{bmatrix} \tilde{X}_1^{i_{1,1}} \otimes \tilde{X}_2^{i_{1,2}} & 0 \\ 0 & \tilde{X}_1^{i_{1,1}} \otimes \tilde{X}_2^{i_{1,2}} \end{bmatrix},$$

where W is a precoding matrix; $\tilde{X}_1^{i_{1,1}}$ is a codeword in the first dimension, and a quantity of columns of $\tilde{X}_1^{i_{1,1}}$ is a quantity $N_1$ of antenna ports in the first dimension; $\tilde{X}_2^{i_{1,2}}$ is a codeword in the second dimension, and a quantity of columns of $\tilde{X}_2^{i_{1,2}}$ is a quantity $N_2$ of antenna ports in the second dimension; $i_{1,1}$ is an index of the codeword in the first dimension, and $i_{1,2}$ is an index of the codeword in the second dimension; W2 corresponds to a third PMI; $\otimes$ is a Kronecker product; $\tilde{X}_1^{i_{1,1}}$ includes discrete Fourier transform (DFT) column vectors, a form of the column vector included in $\tilde{X}_1^{i_{1,1}}$ is $v_{m_1}$, and $v_{m_1}$ meets the following rule:

$$v_{m_1} = \begin{bmatrix} 1 & e^{j\frac{2\pi m_1}{O_1 N_1}} & \cdots & e^{j\frac{2\pi m_1 (N_1 - 1)}{O_1 N_1}} \end{bmatrix}^t, 0 \le m_1 \le N_1 \cdot O_1 - 1,$$

where $O_1$ is an over-sampling factor in the first dimension; and a form of a column vector included in $\tilde{X}_2^{i_{1,2}}$ is $v_{m_2}$, and $v_{m_2}$ meets the following rule:

$$u_{m_2} = \begin{bmatrix} 1 & e^{j\frac{2\pi m_2}{O_2 N_2}} & \cdots & e^{j\frac{2\pi m_2 (N_2 - 1)}{O_2 N_2}} \end{bmatrix}^t, 0 \le m_2 \le N_2 \cdot O_2 - 1,$$

where $O_2$ is an over-sampling factor in the second dimension.

In this embodiment of the present invention, the first PMI is related or unrelated to the second PMI. That the first PMI is related to the second PMI may be described as that a functional relationship exists between the first PMI and the second PMI, and that the first PMI is unrelated to the second PMI may be described as that no functional relationship exists between the first PMI and the second PMI.

Likewise, the third joint index is related or unrelated to the second PMI, or the fourth joint index is related or unrelated to the first PMI. The foregoing descriptions may also be used. Details are not described one by one herein again.

In this embodiment of the present invention, optionally, a set of codewords in the first dimension in W1 that are corresponding to at least M different first PMIs existing in all first PMIs is different from a set of codewords in the second dimension in W1 that are corresponding to second PMIs, where a Kronecker product is performed on the codeword in the first dimension and the codeword in the second dimension; or a set of codewords in the second dimension in W1 that are corresponding to at least M different second PMIs existing in all second PMIs is different from a set of codewords in the first dimension in W1 that are corresponding to first PMIs, where a Kronecker product is performed on the codeword in the first dimension and the codeword in the second dimension.

M is an integer greater than or equal to 2.

In this embodiment of the present invention, optionally, M is related to the over-sampling factor $O_1$ in the first dimension and/or the quantity $N_1$ of antennas in the first dimension, or M is equal to a total quantity of all states of the first PMI.

For example, when a quantity of bits of the first PMI is 2, all states of the first PMI is 4; when a quantity of bits of the first PMI is 3, all states of the first PMI is 8; or when a quantity of bits of the first PMI is 4, all states of the first PMI is 16.

Alternatively, M is related to the over-sampling factor $O_2$ in the second dimension and/or the quantity $N_2$ of antennas in the second dimension, or M is equal to a total quantity of all states of the second PMI.

For example, when a quantity of bits of the second PMI is 2, all states of the second PMI is 4; when a quantity of bits of the second PMI is 3, all states of the second PMI is 8; or when a quantity of bits of the second PMI is 4, all states of the second PMI is 16.

In this embodiment of the present invention, optionally, if the first target index I1 is the first joint index, an index of a codeword corresponding to the first PMI is $I1*Q_1$, and an index of a codeword corresponding to the second PMI is $I1*Q_2$. $Q_1$ and $Q_2$ are integers greater than or equal to 1, as shown in FIG. 2B.

Correspondingly, in FIG. 2B, $N_1=2$, $N_2=2$, $O_1=8$, and $O_2=8$. N1 and N2 are respectively the quantities of antennas in the first dimension and the second dimension. O1 and O2 are respectively the over-sampling factors in the first dimension and the second dimension. A total quantity of DFT vectors in the first dimension is $N_1*O_1$, and a total quantity of DFT vectors in the second dimension is $N_2*O_2$.

Column numbers 0 to 15 indicate numbers of DFT vector sets included in all codewords $\tilde{X}_1^{i_{1,1}}$ in the first dimension, and row numbers 0 to 15 indicate numbers of DFT vector sets included in all codewords $\tilde{X}_2^{i_{1,2}}$ in the second dimension.

A number in a shadow grid in the figure indicates a number for jointly indexing the first PMI and the second PMI. Numbers of DFT vectors included in codewords that are corresponding to the first PMI and that are corresponding to the number for joint indexing are four columns corresponding to eight grids in the upper left corner of the number that are of four columns and two rows. Numbers of DFT vectors included in codewords that are corresponding to the second PMI and that are corresponding to the number for joint indexing are the two rows corresponding to the eight grids in the upper left corner of the number that are of the four columns and the two rows.

A relationship between an index of a codeword corresponding to the first PMI and an index of a DFT vector, of a smallest number, included in a smallest codeword of the first PMI is $i/S_1$. $S_1$ is $S_1$ in FIG. 6.

For example, an index of DFT vectors included in the codeword corresponding to the first PMI is (4,5,6,7). In this case, when $S_1$ is 1, a number of the codeword of the first PMI is 4 obtained by dividing a DFT vector 4 of the smallest number by $S_1$. When $S_1=2$, the number of the codeword of the first PMI is 2.

A number of the codeword corresponding to the second PMI is obtained in a way similar to the foregoing one, and details are not described again.

A row quantity and a column quantity in another figure indicate the same meanings, and details are not described again.

In this embodiment of the present invention, optionally, $Q_1$ is related to a total quantity of antennas in the first dimension and/or the over-sampling factor in the first dimension, and $Q_2$ is related to a total quantity of antennas in the second dimension and/or the over-sampling factor in the second dimension.

In this embodiment of the present invention, optionally, $Q_1=Q_2=1$, or $Q_1=Q_2=2$, or $Q_1=Q_2=4$.

In this embodiment of the present invention, optionally, the method is applicable to a scenario of $N_1=N_2$ or a scenario of $N_1*Q_1=N_2*Q_2$, $N_1$ is the total quantity of antennas in the first dimension, $N_2$ is the total quantity of antennas in the second dimension, $Q_1$ is the over-sampling factor in the first dimension, and $Q_2$ is the over-sampling factor in the second dimension.

In this embodiment of the present invention, optionally, if the first target index I1 is the first joint index, an index of a codeword corresponding to the first PMI is floor(I1 mod Q5)*Q6/S2 or ceil(I1 mod Q5)*Q6/S2, and an index of a codeword corresponding to the second PMI is floor(I1/Q5)*Q7 or ceil(I1/Q5)*Q7; or an index of a codeword corresponding to the second PMI is floor(I1 mod Q5)*Q6/S2 or ceil(I1 mod Q5)*Q6/S2, and an index of a codeword corresponding to the first PMI is floor(I1/Q5)*Q7 or ceil(I1/Q5)*Q7.

Q7=floor($N_2*O_2$/S3) or Q7=ceil($N_2*O_2$/S3), Q6=floor($N_1*O_1$/Q5) or Q6=ceil($N_1*O_1$/Q5), and Q5, Q6, Q7, S2, and S3 are positive integers, as shown in FIG. 2C.

In this embodiment of the present invention, optionally, an index of a codeword corresponding to the first PMI is floor(I1/Q5)*Q6/S1+floor(I1 mod Q5)*Q6/S2, ceil(I1/Q5)*Q6/S1+ceil(I1 mod Q5)*Q6/S2, floor(I1/Q5)*Q6/S1+ceil(I1 mod Q5)*Q6/S2, or ceil(I1/Q5)*Q6/S1+floor(I1 mod Q5)*Q6/S2; and an index of a codeword corresponding to the second PMI is floor(I1/Q5)*Q7 or ceil(I1/Q5)*Q7, where Q7=floor($N_2*O_2$/S3) or Q7=ceil($N_2*O_2$/S3), Q6=floor($N_1*O_1$/Q5) or Q6=ceil($N_1*O_1$/Q5), and Q5, Q6, Q7, S1, S2, and S3 are positive integers, as shown in FIG. 2D; or an index of a codeword corresponding to the second PMI is floor(I1/Q5)*Q6/S1+floor(I1 mod Q5)*Q6/S2, ceil(I1/Q5)*Q6/S1+ceil(I1 mod Q5)*Q6/S2, floor(I1/Q5)*Q6/S1+ceil(I1 mod Q5)*Q6/S2, or ceil(I1/Q5)*Q6/S1+floor(I1 mod Q5)*Q6/S2; and an index of a codeword corresponding to the first PMI is floor(I1/Q5)*Q7 or ceil(I1/Q5)*Q7.

Q7=floor($N_1*O_1$/S3) or Q7=ceil($N_1*O_1$/S3), Q6=floor($N_2*O_2$/Q5) or Q6=ceil($N_2*O_2$/Q5), and Q5, Q6, Q7, S2, and S3 are positive integers. In this embodiment, Q5=4, N1=4, N2=2, O1=8, O2=4, S3=2, and S1=2.

In this embodiment of the present invention, optionally, the index of the codeword corresponding to the first PMI is $i_{1,1}$, and the index of the codeword corresponding to the second PMI is $i_{1,2}$; and in this case, $$i_{1,d_1} = \left\lfloor \frac{I_1}{Q5} \right\rfloor \times \frac{N_{d_1} O_{d_1}}{2Q5S2} + \text{mod}(I_1, Q5) \times \frac{N_{d_1} O_{d_1}}{Q5 s_1},$$

$$i_{1,d_2} = \left\lfloor \frac{I_1}{Q5} \right\rfloor \times \frac{N_{d_2} O_{d_2}}{2S2},$$

$$(d_1, d_2) = \begin{cases} (1, 2) & \text{if } N_1 \geq N_2 \\ (2, 1) & \text{others} \end{cases}, \text{ and}$$

$$Q5 = \begin{cases} 4 & \text{for } N_{d_1} = 4/2 \\ 3 & \text{for } N_{d_1} = 3 \\ 8 & \text{for } N_{d_1} = 8 \end{cases}.$$

In this embodiment of the present invention, optionally, an index of a codeword corresponding to the first PMI is floor(($I_1$/Q5) mod 2)*Q6/S1+floor(I1 mod Q5)*Q6/S2, or an index of a codeword corresponding to the first PMI is floor(($I_1$/Q5) mod 2)*Q6/S1+ceil(I1 mod Q5)*Q6/S2, or an index of a codeword corresponding to the first PMI is ceil(($I_1$/Q5) mod 2)*Q6/S1+ceil(I1 mod Q5)*Q6/S2, or an index of a codeword corresponding to the first PMI is ceil(($I_1$/Q5) mod 2)*Q6/S1+floor(I1 mod Q5)*Q6/S2; and an index of a codeword corresponding to the second PMI is ceil(I1/Q5)*Q7, or an index of a codeword corresponding to the second PMI is floor(I1/Q5)*Q7, where Q7=floor($N_2*O_2$/S3) or Q7=ceil($N_2*O_2$/S3), Q6=floor($N_1*O_1$/Q5) or Q6=ceil($N_1*O_1$/Q5), and I1/Q5 is floor(I1/Q5) or ceil(I1/Q5), as shown in FIG. 2E; or an index of a codeword corresponding to the second PMI is floor((I1/Q5) mod 2)*Q6/S1+floor(I1 mod Q5)*Q6/S2, or an index of a codeword corresponding to the second PMI is floor((I1/Q5) mod 2)*Q6/S1+ceil(I1 mod Q5)*Q6/S2, or an index of a codeword corresponding to the second PMI is ceil((I1/Q5) mod 2)*Q6/S1+ceil(I1 mod Q5)*Q6/S2, or an index of a codeword corresponding to the second PMI is ceil(($I_1$/Q5) mod 2)*Q6/S1+floor(I1 mod Q5)*Q6/S2; and an index of a codeword corresponding to the first PMI is ceil(I1/Q5)*Q7, or an index of a codeword corresponding to the first PMI is floor(I1/Q5)*Q7, where Q7=floor($N_1*O_1$/S3) or Q7=ceil($N_1*O_1$/S3), Q6=floor($N_2*O_2$/Q5) or Q6=ceil($N_2*O_2$/Q5), and I1/Q5 is floor(I1/Q5) or ceil(I1/Q5).

In this embodiment of the present invention, optionally, an index of a codeword corresponding to the first PMI is floor(I1/Q5)*Q6/S1 or ceil(I1/Q5)*Q6/S1, and an index of a codeword corresponding to the second PMI is floor(($I_1$/

Q5)*Q6/S1)+ceil(I1 mod Q5)*Q6/S2), floor((I$_1$/Q5)*Q6/S1)+floor(I1 mod Q5)*Q6/S2), ceil((I$_1$/Q5)*Q6/S1)+floor (I1 mod Q5)*Q6/S2), or ceil((I$_1$/Q5)*Q6/S1)+ceil(I1 mod Q5)*Q6/S2), as shown in FIG. 2F; or an index of a codeword corresponding to the second PMI is floor(I1/Q5)*Q6/S1 or ceil(I1/Q5)*Q6/S1, and an index of a codeword corresponding to the first PMI is floor((I$_1$/Q5)*Q6/S1)+ceil (I1 mod Q5)*Q6/S2), floor((I$_1$/Q5)*Q6/S1)+floor(I1 mod Q5)*Q6/S2), ceil((I$_1$/Q5)*Q6/S1)+floor(I1 mod Q5)*Q6/S2), or ceil((I$_1$/Q5)*Q6/S1)+ceil(I1 mod Q5)*Q6/S2), where Q6=floor(N1*Q$_1$/Q5) or ceil(N1*Q$_1$/Q5). As an embodiment, where an index of a codeword corresponding to the first PMI is I1*Q6/S2, and an index of a codeword corresponding to the second PMI is I1.

In this embodiment of the present invention, optionally, S2=8.

In this embodiment of the present invention, optionally, an index of a codeword corresponding to the first PMI is floor(I1*Q4) or ceil(I1*Q4), and an index of a codeword corresponding to the second PMI is floor(I1 mod Q5)*Q7 or ceil(I1 mod Q5)*Q7; or an index of a codeword corresponding to the second PMI is floor(I1*Q4) or ceil(I1*Q4), and an index of a codeword corresponding to the first PMI is floor(I1 mod Q5)*Q7 or ceil(I1 mod Q5)*Q7, as shown in FIG. 2G.

In this embodiment of the present invention, optionally, Q7=1.

In this embodiment of the present invention, optionally, an index of a codeword corresponding to the first PMI is floor(I1*Q6/S2) or ceil(I1*Q6/S2), and an index of a codeword corresponding to the second PMI is floor(I1 mod Q8)*Q7 or ceil(I1 mod Q8)*Q7, where Q7=floor(N$_2$*O$_2$/S3) or Q7=ceil(N$_2$*O$_2$/S3), and Q6=floor(N$_1$*O$_1$/Q5) or Q6=ceil(N$_1$*O$_1$/Q5); or an index of a codeword corresponding to the second PMI is floor(I1*Q6/S2) or ceil(I1*Q6/S2), and an index of a codeword corresponding to the first PMI is floor(I1 mod Q8)*Q7 or ceil(I1 mod Q8)*Q7, where Q7=floor(N$_1$*O$_1$/S3) or Q7=ceil(N$_1$*O$_1$/S3), and Q6=floor (N$_2$*O$_2$/Q5) or Q6=ceil(N$_2$*O$_2$/Q5), as shown in FIG. 2H.

In this embodiment of the present invention, optionally, S3=2 or S3=4.

In this embodiment of the present invention, optionally, an index of a codeword corresponding to the second PMI is floor(Q7*I1,2) or ceil(Q7*I1,2), and an index of a codeword corresponding to the first PMI is floor(Q8*I1,2+i1,1*Q5) or ceil(Q8*I1,2+i1,1*Q5); or an index of a codeword corresponding to the first PMI is floor(Q7*I1,2) or ceil(Q7*I1,2), and an index of a codeword corresponding to the second PMI is floor(Q8*I1,2+i1,1*Q5) or ceil(Q8*I1,2+i1,1*Q5), as shown in FIG. 2H.

In this embodiment of the present invention, optionally, the fourth joint index $I_{RI/second\ PMI}$ and the second PMI I1,2 have the following correspondence and meet the following rule:

| $I_{RI//second\ PMI}$ | RI | I1,2 |
|---|---|---|
| 0 to Y0 | 1 | $I_{RI//second\ PMI}$ |
| Y0 + 1 to Y1 | 2 | $I_{RI//second\ PMI\text{-}Y0\text{-}1}$ |
| Y1 + 1 to Y2 | 3 | $I_{RI//second\ PMI\text{-}Y1\text{-}1}$ |
| Y2 + 1 to Y3 | 4 | $I_{RI//second\ PMI}$-Y2-1 |

In this embodiment of the present invention, optionally, the first joint index I1 and the second joint index $I_{RI/first\ PMI/second\ PMI}$ meet the following rule:

| $I_{RI/first\ PMI/second\ PMI}$ | RI | I1 |
|---|---|---|
| 0 to Y0 | 1 | $I_{RI/first\ PMI/second\ PMI}$ |
| Y0 + 1 to Y1 | 2 | $I_{RI/first\ PMI/second\ PMI}$-(Y0 + 1) |
| Y1 + 1 to Y2 | 3 | $I_{RI/first\ PMI/second\ PMI}$-(Y1 + 1) |
| Y2 + 1 to Y3 | 4 | $I_{RI/first\ PMI/second\ PMI}$-(Y2 + 1) |

Y0 + 1 is $I_{RI/first\ PMI/total\ quantity\ of\ all\ states\ of\ the\ second\ PMI}$ when a rank is 1;
Y1 + 1 is $I_{RI/first\ PMI/total\ quantity\ of\ all\ states\ of\ the\ second\ PMI}$ when the rank is 2;
Y2 + 1 is $I_{RI/first\ PMI/total\ quantity\ of\ all\ states\ of\ the\ second\ PMI}$ when the rank is 3; and
Y3 + 1 is $I_{RI/first\ PMI/total\ quantity\ of\ all\ states\ of\ the\ second\ PMI}$ when the rank is 4.

In this embodiment of the present invention, optionally, when the rank is 1, Codebook-Subset-SelectionConfig is a configuration 1, and when the third PMI is 2 bits, serial numbers of codewords that are of W2 and that are corresponding to the third PMI are 0 to 3; or when the third PMI is 1 bit, used serial numbers of codewords are 0 and 2; or when Codebook-Subset-SelectionConfig is a configuration 2, and the third PMI is 2 bits, serial numbers of codewords that are of W2 and that are corresponding to the third PMI are 0, 2, 20, and 22, or 1, 3, 21, and 23, or 0 to 3, or 4, 6, 16, and 18, or 5, 7, 17, and 19, or 0, 2, 4, and 6, or 16, 18, 20, and 22, or 1, 3, 5, and 7, or 17, 19, 21, and 23; or when Codebook-Subset-SelectionConfig is a configuration 3, and the third PMI is 2 bits, serial numbers of codewords that are of W2 and that are corresponding to the third PMI are 0, 2, 28, and 30, or 1, 3, 29, and 31, or 0 to 3, or 0, 2, 8, and 10, or 1, 3, 9, and 11, or 0, 2, 20, and 22, or 1, 3, 21, and 23; or when Codebook-Subset-SelectionConfig is a configuration 4, and the third PMI is 2 bits, codewords of W2 that are corresponding to the third PMI are 0, 2, 8, and 10, or 1, 3, 9, and 11, where the codewords of W2 are:

$$W_2 \in C_2 = \left\{ \frac{1}{\sqrt{x}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\}$$

$Y \in \{\tilde{e}_1, \tilde{e}_2, \tilde{e}_3, \tilde{e}_4\tilde{e}_5, \tilde{e}_6, \tilde{e}_7, \tilde{e}_2\}$, where
four states $$\frac{1}{\sqrt{x}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix}$$

corresponding to a number $\tilde{e}_1$ of a codeword corresponding to W2 are numbered from 0 to 3, four states of $\tilde{e}_2$ are then sequentially numbered from 4 to 7, four states of $\tilde{e}_3$ are numbered from 8 to 11, four states of $\tilde{e}_4$ are numbered from 12 to 15, four states of $\tilde{e}_5$ are numbered from 16 to 19, four states of $\tilde{e}^6$ are numbered from 20 to 23, four states of e are numbered from 24 to 27, and four states of $\tilde{e}_8$ are numbered from 28 to 31, where x is a parameter related to a quantity of antenna ports.

In this embodiment of the present invention, optionally, S1=2 or 3 or S1=4; or
S2=1 or S2=2 or 3;
Q5=2, 3, 4, 6 or 8 or S3=2, 3, 4, or 8; and
Q5, Q6, and Q7 are related to N1, N2, O1, and O2 and/or related to quantities of bits of the first PMI and the second PMI; or Q5, Q6, and Q7 are related to a feedback mode or related to a configuration mode.

In this embodiment of the present invention, optionally, S2 and S3 are related to codebook subset selection configuration information and/or the quantity of antenna ports and/or an over-sampling factor.

When Codebook-Subset-SelectionConfig is the configuration 1, S2=1, and when Codebook-Subset-SelectionConfig is the configurations 2 to 4, S2=2; or when Codebook-Subset-SelectionConfig is the configuration 1, S2=2, and when Codebook-Subset-SelectionConfig is the configurations 2 to 4, S2=4; or when Codebook-Subset-SelectionConfig is the configuration 1, S3=1, and when Codebook-Subset-SelectionConfig is the configurations 2 to 4, S3=2; or when Codebook-Subset-SelectionConfig is the configuration 1, S3=2, and when Codebook-Subset-SelectionConfig is the configurations 2 to 4, S3=4.

In this embodiment of the present invention, optionally, Q5=2, 3, 4, 6, or 8, and 81=2 or S1=4, or S3=2, 4, or 8.

When Codebook-Subset-SelectionConfig is the configuration 1, S2=1, and when Codebook-Subset-SelectionConfig is the configurations 2 to 4, S2=2; or when Codebook-Subset-SelectionConfig is the configuration 1, S3=2, and when Codebook-Subset-SelectionConfig is the configurations 2 to 4, S3=4.

Codebook-Subset-SelectionConfig is configuration information for performing subset restriction on a codeword of W2. As shown in FIG. 6, there are four configurations in total in FIG. 6. Eight grids in each configuration correspond to eight vectors obtained after performing a Kronecker product on codewords in two dimensions. Numbers 0 to 3 in a horizontal direction correspond to numbers of four DFT vectors in $\tilde{X}_1^{i_{1,1}}$, and numbers 0 to 2 in a vertical direction correspond to numbers of two DFT vectors in $\tilde{X}_2^{i_{1,2}}$. $S_1$ indicates a quantity of DFT vectors that stagger two codewords of adjacent numbers in $\tilde{X}_1^{i_{1,1}}$, and $S_2$ indicates a quantity of DFT vectors that stagger two codewords of adjacent numbers in $\tilde{X}_2^{i_{1,2}}$.

Optionally, the first CSI is CSI corresponding to a CSI process, and includes at least two of a first CSI reporting type, a second CSI reporting type, a third CSI reporting type, or a fourth CSI reporting type.

The reporting types are CSI content reported at a same moment.

The first CSI reporting type includes a rank indicator RI, the second CSI reporting type includes a first broadband PMI and a second broadband PMI or an index jointly generated based on the first broadband PMI and the second broadband PMI, the third CSI reporting type includes a third broadband PMI and a broadband channel quality indicator CQI, and the third broadband PMI indicates an index of a codebook included in W2; or the first CSI reporting type includes an RI and a first broadband PMI or an index jointly generated based on the RI and the first broadband PMI, the second CSI reporting type includes a second broadband PMI, and the third CSI reporting type includes a third broadband PMI and a broadband CQI; or the first CSI reporting type includes an RI and a second broadband PMI or a joint index of the RI and the second broadband PMI, the second CSI reporting type includes a first broadband PMI, and the third CSI reporting type includes a third broadband PMI and a broadband CQI; or the first CSI reporting type includes an RI and a fourth broadband PMI, the second CSI reporting type includes a fifth broadband PMI, the third CSI reporting type includes a third broadband PMI and a broadband CQI, the fourth broadband PMI is a minimum value of a first broadband PMI and a second broadband PMI, and the fifth broadband PMI is a maximum value of the first broadband PMI and the second broadband PMI; or the first CSI reporting type includes an RI and a first broadband PMI or a joint index of the RI and the first broadband PMI, and the second CSI reporting type includes a second broadband PMI, a third broadband PMI, and a broadband CQI; or the first CSI reporting type includes an RI and a second broadband PMI or a joint index of the RI and the second broadband PMI, and the second CSI reporting type includes a first broadband PMI, a third broadband PMI, and a broadband CQI; or the first CSI reporting type includes an RI and a fourth broadband PMI, and the second CSI reporting type includes a fifth broadband PMI, a third broadband PMI, and a broadband CQI; or the first CSI reporting type includes an RI, the second CSI reporting type includes a first broadband PMI, the third CSI reporting type includes a second broadband PMI, and the fourth CSI includes a third broadband PMI and a CQI; or the first CSI reporting type includes an RI, the second CSI reporting type includes a first broadband PMI, and the third CSI reporting type includes a second broadband PMI, a third broadband PMI, and a broadband CQI; or the first CSI reporting type includes an RI, the second CSI reporting type includes an indication parameter of a codebook configuration manner, the third CSI reporting type includes a first broadband PMI and a second broadband PMI, and the codebook configuration indication parameter is used to indicate a codebook aggregation manner; or the first CSI reporting type includes an RI and an indication parameter of a configuration manner, and the second CSI reporting type includes a second broadband PMI, a third broadband PMI, and a broadband CQI.

The first CSI further includes the fourth CSI reporting type. The fourth CSI reporting type includes a third broadband PMI and a broadband CQI.

A first CSI reporting period is longer than a second CSI reporting period, and the second CSI reporting period is longer than a third CSI reporting period; or a first CSI reporting period is longer than a second CSI reporting period; or a first CSI reporting period is longer than a second CSI reporting period, the second CSI reporting period is longer than a third CSI reporting period, and the third CSI reporting period is longer than a fourth CSI reporting period.

The first CSI reporting period corresponds to the first CSI reporting type, the second CSI reporting period corresponds to the second CSI reporting type, and the third CSI reporting period corresponds to the third CSI reporting type.

Content included in the CSI reporting type is related to a Codebook-Subset-SelectionConfig manner.

Different states of a PTI indicate whether broadband reporting or subband reporting is used next to report the first PMI and the second PMI or whether the first PMI or the second PMI is reported next.

The first CSI is CSI corresponding to a CSI process, and includes at least three of a first CSI reporting type, a second CSI reporting type, a third CSI reporting type, a fourth CSI reporting type, a fifth CSI reporting type, a sixth CSI reporting type, or a seventh CSI reporting type.

The reporting types are CSI content reported at a same moment, and each reporting type corresponds to a reporting period.

The first CSI reporting type includes a PTI and an RI, the second CSI reporting type includes a first broadband PMI and a second broadband PMI or an index jointly generated based on the first broadband PMI and the second broadband PMI, the third CSI reporting type includes a third broadband PMI and a broadband channel quality indicator CQI, and the fourth CSI reporting type includes a third subband PMI and a subband CQI. When PTI=0, the second CSI reporting type and the third CSI reporting type are reported next; or when PTI=1, the second CSI reporting type and the fourth CSI reporting type are reported next.

Alternatively, the first CSI reporting type includes a PTI and an RI, the second CSI reporting type includes a first broadband PMI and a second broadband PMI or an index jointly generated based on the first broadband PMI and the second broadband PMI, the third CSI reporting type includes a third broadband PMI and a broadband channel quality indicator CQI, the fourth CSI reporting type includes a third subband PMI and a subband CQI, the fifth CSI reporting type includes the second broadband PMI and the third broadband PMI, and the sixth CSI reporting type includes the first broadband PMI and the third broadband PMI. When the PTI is in a first state, the second CSI reporting type and the third CSI reporting type are reported next; when the PTI is in a second state, the fifth CSI reporting type and the fourth CSI reporting type are reported next; or when the PTI is in a third state, the sixth CSI reporting type and the fourth CSI reporting type are reported next.

Alternatively, the first CSI reporting type includes a PTI and an RI, the second CSI reporting type includes a first broadband PMI and a second broadband PMI or an index jointly generated based on the first broadband PMI and the second broadband PMI, the third CSI reporting type includes a third broadband PMI and a broadband channel quality indicator CQI, the fourth CSI reporting type includes a third subband PMI and a subband CQI, the fifth CSI reporting type includes the first broadband PMI and a second subband PMI, the sixth CSI reporting type includes the second broadband PMI and the third subband PMI, and the seventh CSI reporting type includes the second subband PMI and the third subband PMI. When the PTI is in a first state, the second CSI reporting type and the third CSI reporting type are reported next; when the PTI is in a second state, the fifth CSI reporting type and the fourth CSI reporting type are reported next; when the PTI is in a third state, the sixth CSI reporting type and the fourth CSI reporting type are reported next; or when the PTI is in a fourth state, the seventh CSI reporting type and the fourth CSI reporting type are reported next.

The method further includes the following.

The base station sends a reporting indication to the terminal, so that the terminal sends an RI, a CQI, and one of the first PMI and the second PMI based on the reporting indication at a non-periodical reporting moment.

A subframe interval between a subframe for sending the first CSI and a reference subframe corresponding to the subframe for sending the first CSI is related to an antenna configuration and/or an over-sampling factor.

The subframe interval is related to a quantity of codebooks included in a codebook restriction subset of W1, and the codebook restriction subset is a set of codebooks, in W1, that can be indicated by the first PMI and the second PMI.

The subframe interval is related to K.

The first CSI is specific to a first-type CSI process.

The method further includes the following:

The base station receives the second CSI sent by the terminal, where the second CSI is specific to a second-type CSI process.

The terminal determines that the first CSI and the second CSI need to be sent in a same time unit, and sends only the first CSI when a priority of the first CSI is higher than a priority of the second CSI.

That the priority of the first CSI is higher than the priority of the second CSI may be determined in the following manner: determining, according to at least one piece of the following information, that the priority of the first CSI is higher than the priority of the second CSI: a CSI reporting type, a carrier number of a carrier corresponding to CSI, a CSI process corresponding to the CSI, or an attribute of a reference signal corresponding to the CSI.

That the priority of the first CSI is higher than the priority of the second CSI may be determined in the following manner based on the attribute of the reference signal corresponding to the CSI:

If a reference signal corresponding to one piece of CSI of the first CSI and the second CSI is precoded and a reference signal corresponding to the other piece of CSI is not precoded, the terminal determines, based on an attribute of whether the reference signal corresponding to the CSI is precoded, that the priority of the first CSI is higher than the priority of the second CSI; or if reference signals respectively corresponding to the first CSI and the second CSI are both precoded, the terminal determines, according to attributes of sub-reference signals included in the precoded reference signals corresponding to the CSI, that the priority of the first CSI is higher than the priority of the second CSI.

The CSI reporting type corresponding to the first CSI is the same as or different from a CSI reporting type corresponding to the second CSI.

The first CSI further includes an RI and a CQI.

When a quantity of sub-reference signals included in the reference signal corresponding to the second CSI is greater than 1, the second CSI includes an index of a sub-reference signal resource, and an RI, a PMI, and a CQI that are of a sub-reference signal corresponding to the index; or when a quantity of sub-reference signals included in the reference signal corresponding to the second CSI is greater than 1, the second CSI includes an RI, a PMI, and a CQI.

A priority of the first-type CSI process is higher than a priority of the second-type CSI process.

The quantity of sub-reference signals included in the reference signal corresponding to the second CSI is greater than 1 (A>B1); or the quantity of sub-reference signals included in the reference signal corresponding to the second CSI is equal to 1 (A>B2).

The method further includes the following.

The base station receives third CSI sent by the terminal, where the third CSI is specific to the second-type CSI process.

If the quantity of sub-reference signals included in the reference signal corresponding to the second CSI is greater than 1, and a quantity of sub-reference signals included in a reference signal corresponding to the third CSI is equal to 1, the priority of the second CSI is higher than a priority of the third CSI; or if the quantity of sub-reference signals included in the reference signal corresponding to the second CSI is greater than 1, and a quantity of sub-reference signals included in a reference signal corresponding to the third CSI is equal to 1, a priority of the third CSI is higher than the priority of the second CSI.

The first CSI is specific to a second-type CSI process and the first-type CSI process.

The method further includes the following.

The base station receives the second CSI sent by the terminal, where the second CSI is specific to a first-type CSI process and the second-type CSI process.

The terminal determines that the first CSI and the second CSI need to be sent in a same time unit, and sends only the first CSI when a priority of the first CSI is higher than a priority of the second CSI.

That the priority of the first CSI is higher than the priority of the second CSI may be determined in the following manner: determining, according to at least one piece of the following information, that the priority of the first CSI is higher than the priority of the second CSI: a CSI reporting type, a carrier number of a carrier corresponding to CSI, a CSI process corresponding to the CSI, or an attribute of a reference signal corresponding to the CSI.

That the priority of the first CSI is higher than the priority of the second CSI may be determined in the following manner based on the attribute of the reference signal corresponding to the CSI.

If a reference signal corresponding to one piece of CSI of the first CSI and the second CSI is precoded and a reference signal corresponding to the other piece of CSI is not precoded, the terminal determines, based on an attribute of whether the reference signal corresponding to the CSI is precoded, that the priority of the first CSI is higher than the priority of the second CSI; or if reference signals respectively corresponding to the first CSI and the second CSI are both precoded, the terminal determines, according to attributes of sub-reference signals included in the precoded reference signals corresponding to the CSI, that the priority of the first CSI is higher than the priority of the second CSI.

The first CSI further includes an RI and a CQI.

When a quantity of sub-reference signals included in the reference signal corresponding to the second CSI is greater than 1, the second CSI includes an index of a sub-reference signal resource, and an RI, a PMI, and a CQI that are of a sub-reference signal corresponding to the index; or when a quantity of sub-reference signals included in the reference signal corresponding to the second CSI is greater than 1, the second CSI includes an RI, a PMI, and a CQI.

The CSI reporting type corresponding to the first CSI is the same as or different from a CSI reporting type corresponding to the second CSI.

A priority of the second-type CSI process is higher than a priority of the first-type CSI process.

The quantity of sub-reference signals included in the reference signal corresponding to the second CSI is greater than 1 (A<B1); or the quantity of sub-reference signals included in the reference signal corresponding to the second CSI is equal to 1 (A<B2).

The method further includes the following.

The base station receives the third CSI sent by the terminal, where the third CSI is specific to the second-type CSI process.

If the quantity of sub-reference signals included in the reference signal corresponding to the second CSI is greater than 1, and a quantity of sub-reference signals included in a reference signal corresponding to the third CSI is equal to 1, the priority of the second CSI is higher than a priority of the third CSI, and the priority of the third CSI is higher than the priority of the first CSI (B2>B1>A); or if the quantity of sub-reference signals included in the reference signal corresponding to the second CSI is greater than 1, and a quantity of sub-reference signals included in a reference signal corresponding to the third CSI is equal to 1, a priority of the third CSI is higher than the priority of the second CSI, and the priority of the second CSI is higher than the priority of the first CSI (B1>B2>A).

The method further includes the following.

The base station receives the third CSI sent by the terminal, where the third CSI is specific to the second-type CSI process.

If the quantity of sub-reference signals included in the reference signal corresponding to the second CSI is greater than 1, and a quantity of sub-reference signals included in a reference signal corresponding to the third CSI is equal to 1, the priority of the second CSI is higher than the priority of the first CSI, and the priority of the first CSI is higher than a priority of the third CSI (B2>A>B1); or if the quantity of sub-reference signals included in the reference signal corresponding to the second CSI is greater than 1, and a quantity of sub-reference signals included in a reference signal corresponding to the third CSI is equal to 1, a priority of the third CSI is higher than the priority of the first CSI, and the priority of the first CSI is higher than the priority of the third CSI (B1>A>B2).

The method further includes the following.

If the quantity of sub-reference signals included in the reference signal corresponding to the second CSI and a quantity of sub-reference signals included in a reference signal corresponding to the third CSI both are greater than 1, the second CSI includes an index of the sub-reference signal, and the third CSI does not include an index of the sub-reference signal, a priority of a reporting type corresponding to the second CSI is higher than a priority of a reporting type corresponding to the third CSI.

The method further includes the following.

If the quantity of sub-reference signals included in the reference signal corresponding to the second CSI is greater than 1, and a quantity of sub-reference signals included in a reference signal corresponding to the third CSI is equal to 1, the priority of the second CSI is higher than a priority of the third CSI.

The method further includes the following.

If the quantity of sub-reference signals included in the reference signal corresponding to the second CSI is greater than 1, and the second CSI includes an index of a sub-reference signal resource, the priority of the second CSI is higher than the priority of the first CSI.

Figure 4A:
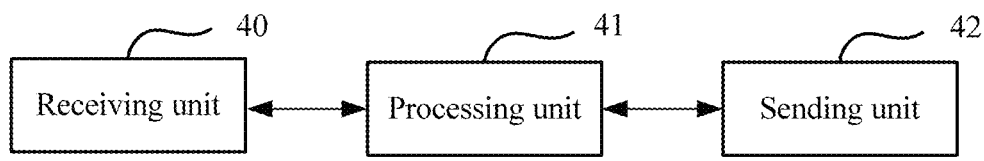
FIG. 4A is a schematic diagram of a CSI measurement and feedback apparatus according to an embodiment of the present invention.

As shown in FIG. 4A, an embodiment of the present invention provides a CSI measurement and feedback apparatus. The apparatus includes a receiving unit 40, a processing unit 41, a sending unit 42.

The receiving unit 40 is configured to receive a reference signal sent by a base station.

The processing unit 41 is configured to perform channel measurement based on the reference signal, to obtain first CSI carrying a target index, where the target index is a first joint index, and the first joint index is an index jointly generated based on a first precoding matrix indicator PMI and a second PMI; or the target index is a second joint index, and the second joint index is an index jointly generated based on a rank indicator RI, the first PMI, and the second PMI; or the target index is the first PMI and the second PMI; or the target index is a third joint index and the second PMI, and the third joint index is an index jointly generated based on the first PMI and the RI; or the target index is a fourth joint index and the first PMI, the fourth joint index is an index jointly generated based on the second PMI and the RI, the first PMI indicates an index of a codeword in a first dimension in W1, and the second PMI indicates an index of a codeword in a second dimension in W1.

The sending unit 42 is configured to send the first CSI.

W1 meets the following rule:

W=W1*W2, and $$W_1(i_{1,1}, i_{1,2}) = \begin{bmatrix} \tilde{X}_1^{i_{1,1}} \otimes \tilde{X}_2^{i_{1,2}} & 0 \\ 0 & \tilde{X}_1^{i_{1,1}} \otimes \tilde{X}_2^{i_{1,2}} \end{bmatrix},$$

where

W is a precoding matrix; $\tilde{X}_1^{i_{1,1}}$ is a codeword in the first dimension, and a quantity of columns of $\tilde{X}_1^{i_{1,1}}$ is a quantity $N_1$ of antenna ports in the first dimension; $\tilde{X}_2^{i_{1,2}}$ is a codeword in the second dimension, and a quantity of columns of $\tilde{X}_2^{i_{1,2}}$ is a quantity $N_2$ of antenna ports in the second dimension; $i_{1,1}$ is an index of the codeword in the first dimension, and $i_{1,2}$ is an index of the codeword in the second dimension; W2 corresponds to a third PMI; $\otimes$ is a Kronecker product; $\tilde{X}_1^{i_{1,1}}$ includes discrete Fourier transform DFT column vectors, a form of the column vector included in $\tilde{X}_1^{i_{1,1}}$ is $v_{m_1}$, and $v_{m_2}$ meets the following rule:

$$v_{m_1} = \begin{bmatrix} 1 & e^{j\frac{2\pi m_1}{O_1 N_1}} & \ldots & e^{j\frac{2\pi m_1 (N_1-1)}{O_1 N_1}} \end{bmatrix}^t, 0 \le m_1 \le N_1 \cdot O_1 - 1,$$

where $O_1$ is an over-sampling factor in the first dimension; and a form of a column vector included in $\tilde{X}_2^{i_{1,2}}$ is $v_{m_2}$, and $v_{m_2}$ meets the following rule:

$$u_{m_2} = \begin{bmatrix} 1 & e^{j\frac{2\pi m_2}{O_2 N_2}} & \ldots & e^{j\frac{2\pi m_2 (N_2-1)}{O_2 N_2}} \end{bmatrix}^t, 0 \le m_2 \le N_2 \cdot O_2 - 1,$$

where $O_2$ is an over-sampling factor in the second dimension.

The first PMI is related or unrelated to the second PMI, or the third joint index is related or unrelated to the second PMI, or the fourth joint index is related or unrelated to the first PMI.

A set of codewords in the first dimension in W1 that are corresponding to at least M different first PMIs existing in all first PMIs is different from a set of codewords in the second dimension in W1 that are corresponding to second PMIs, where a Kronecker product is performed on the codeword in the first dimension and the codeword in the second dimension; or a set of codewords in the second dimension in W1 that are corresponding to at least M different second PMIs existing in all second PMIs is different from a set of codewords in the first dimension in W1 that are corresponding to first PMIs, where a Kronecker product is performed on the codeword in the first dimension and the codeword in the second dimension.

M is an integer greater than or equal to 2.

M is related to the over-sampling factor O0 in the first dimension and/or the quantity $N_1$ of antennas in the first dimension, or M is equal to a total quantity of all states of the first PMI.

Alternatively, M is related to the over-sampling factor $O_2$ in the second dimension and/or the quantity $N_2$ of antennas in the second dimension, or M is equal to a total quantity of all states of the second PMI.

If the first target index I1 is the first joint index, an index of a codeword corresponding to the first PMI is I1*$Q_1$, and an index of a codeword corresponding to the second PMI is I1*$Q_2$. $Q_1$ and $Q_2$ are integers greater than or equal to 1.

$Q_1$ is related to a total quantity of antennas in the first dimension and/or the over-sampling factor in the first dimension, and $Q_2$ is related to a total quantity of antennas in the second dimension and/or the over-sampling factor in the second dimension.

$Q_1=Q_2=1$, or $Q_1=Q_2=2$, or $Q_1=Q_2=4$.

The apparatus is applicable to a scenario of $N_1=N_2$ or a scenario of $N_1*Q_1=N2*Q_2$, $N_1$ is the total quantity of antennas in the first dimension, $N_2$ is the total quantity of antennas in the second dimension, $Q_1$ is the over-sampling factor in the first dimension, and $Q_2$ is the over-sampling factor in the second dimension.

If the first target index I1 is the first joint index, an index of a codeword corresponding to the first PMI is floor(I1 mod Q5)*Q6/S2 or ceil(I1 mod Q5)*Q6/S2, and an index of a codeword corresponding to the second PMI is floor(I1/Q5)* Q7 or ceil(I1/Q5)*Q7; or an index of a codeword corresponding to the second PMI is floor(I1 mod Q5)*Q6/S2 or ceil(I1 mod Q5)*Q6/S2, and an index of a codeword corresponding to the first PMI is floor(I1/Q5)*Q7 or ceil(I1/Q5)*Q7.

Q7=floor($N_2$*$O_2$/S3) or Q7=ceil($N_2$*$O_2$/S3), Q6=floor($N_1$*$O_1$/Q5) or Q6=ceil($N_1$*$O_1$/Q5), and Q5, Q6, Q7, S2, and S3 are positive integers.

An index of a codeword corresponding to the first PMI is floor(I1/Q5)*Q6/S1+floor(I1 mod Q5)*Q6/S2, ceil(I1/Q5)* Q6/S1+ceil(I1 mod Q5)*Q6/S2, floor(I1/Q5)*Q6/S1+ceil (I1 mod Q5)*Q6/S2, or ceil(I1/Q5)*Q6/S1+floor(I1 mod Q5)*Q6/S2; and an index of a codeword corresponding to the second PMI is floor(I1/Q5)*Q7 or ceil(I1/Q5)*Q7, where Q7=floor($N_2$*$O_2$/S3) or Q7=ceil($N_2$*$O_2$/S3), Q6=floor($N_1$*$O_1$/Q5) or Q6=ceil($N_1$*$O_1$/Q5), and Q5, Q6, Q7, S1, S2, and S3 are positive integers; or an index of a codeword corresponding to the second PMI is floor(I1/Q5)* Q6/S1+floor(I1 mod Q5)*Q6/S2, ceil(I1/Q5)*Q6/S1+ceil (I1 mod Q5)*Q6/S2, floor(I1/Q5)*Q6/S1+ceil(I1 mod Q5)*Q6/S2, or ceil(I1/Q5)*Q6/S1+floor(I1 mod Q5)*Q6/ S2; and an index of a codeword corresponding to the first PMI is floor(I1/Q5)*Q7 or ceil(I1/Q5)*Q7.

Q7=floor($N_1$*$O_1$/S3) or Q7=ceil($N_1$*$O_1$/S3), Q6=floor ($N_2$*$O_2$/Q5) or Q6=ceil($N_2$*$O_2$/Q5), and Q5, Q6, Q7, S2, and S3 are positive integers.

The index of the codeword corresponding to the first PMI is $i_{1,1}$, and the index of the codeword corresponding to the second PMI is $i_{1,2}$; and in this case, $$i_{1,d_1} = \left\lfloor \frac{I_1}{Q5} \right\rfloor \times \frac{N_{d_1} O_{d_1}}{2Q5S2} + \mathrm{mod}(I_1, Q5) \times \frac{N_{d_1} O_{d_1}}{Q5s_1},$$

$$i_{1,d_2} = \left\lfloor \frac{I_1}{Q5} \right\rfloor \times \frac{N_{d_2} O_{d_2}}{2S2},$$

$$(d_1, d_2) = \begin{cases} (1, 2) & \text{if } N_1 \ge N_2 \\ (2, 1) & \text{others} \end{cases}, \text{ and}$$

$$Q5 = \begin{cases} 4 & \text{for } N_{d_1} = 4/2 \\ 3 & \text{for } N_{d_1} = 3 \\ 8 & \text{for } N_{d_1} = 8 \end{cases}.$$

An index of a codeword corresponding to the first PMI is floor(($I_1$/Q5) mod 2)*Q6/S1+floor(I1 mod Q5)*Q6/S2, or an index of a codeword corresponding to the first PMI is floor(($I_1$/Q5) mod 2)*Q6/S1+ceil(I1 mod Q5)*Q6/S2, or an index of a codeword corresponding to the first PMI is ceil(($I_1$/Q5) mod 2)*Q6/S1+ceil(I1 mod Q5)*Q6/S2, or an index of a codeword corresponding to the first PMI is ceil(($I_1$/Q5) mod 2)*Q6/S1+floor(I1 mod Q5)*Q6/S2; and an index of a codeword corresponding to the second PMI is ceil(I1/Q5)*Q7, or an index of a codeword corresponding to the second PMI is floor(I1/Q5)*Q7, where Q7=floor ($N_2$*$O_2$/S3) or Q7=ceil($N_2$*$O_2$/S3), Q6=floor($N_1$*$O_1$/Q5) or Q6=ceil($N_1$*$O_1$/Q5), and I1/Q5 is floor(I1/Q5) or ceil(I1/ Q5); or an index of a codeword corresponding to the second PMI is floor((I1/Q5) mod 2)*Q6/S1+floor(I1 mod Q5)*Q6/ S2, or an index of a codeword corresponding to the second PMI is floor((I1/Q5) mod 2)*Q6/S1+ceil(I1 mod Q5)*Q6/ S2, or an index of a codeword corresponding to the second PMI is ceil((I1/Q5) mod 2)*Q6/S1+ceil(I1 mod Q5)*Q6/S2, or an index of a codeword corresponding to the second PMI is ceil((I1/Q5) mod 2)*Q6/S1+floor(I1 mod Q5)*Q6/S2; and an index of a codeword corresponding to the first PMI is ceil(I1/Q5)*Q7, or an index of a codeword corresponding to the first PMI is floor(I1/Q5)*Q7, where Q7=floor(N1*O1/S3) or Q7=ceil(N1*O1/S3), and Q6=floor(N2*O2/Q5) or Q6=ceil(N2*O2/Q5).

I1/Q5 is floor(I1/Q5) or ceil(I1/Q5).

An index of a codeword corresponding to the first PMI is floor(I1/Q5)*Q6/S1 or ceil(I1/Q5)*Q6/S1, and an index of a codeword corresponding to the second PMI is floor(($I_1$/Q5)*Q6/S1)+ceil(I1 mod Q5)*Q6/S2), floor(($I_1$/Q5)*Q6/S1)+floor(I1 mod Q5)*Q6/S2), ceil(($I_1$/Q5)*Q6/S1)+floor(I1 mod Q5)*Q6/S2), or ceil(($I_1$/Q5)*Q6/S1)+ceil(I1 mod Q5)*Q6/S2); or an index of a codeword corresponding to the second PMI is floor(I1/Q5)*Q6/S1 or ceil(I1/Q5)*Q6/S1, and an index of a codeword corresponding to the first PMI is floor(($I_1$/Q5)*Q6/S1)+ceil(I1 mod Q5)*Q6/S2), floor(($I_1$/Q5)*Q6/S1)+floor(I1 mod Q5)*Q6/S2), ceil(($I_1$/Q5)*Q6/S1)+floor(I1 mod Q5)*Q6/S2), or ceil(($I_1$/Q5)*Q6/S1)+ceil(I1 mod Q5)*Q6/S2), where Q6=floor(N1*$Q_1$/Q5) or ceil(N1*$Q_1$/Q5). As an embodiment, where an index of a codeword corresponding to the first PMI is I1*Q6/S2, and an index of a codeword corresponding to the second PMI is I1.S2=8.

An index of a codeword corresponding to the first PMI is floor(I1*Q4) or ceil(I1*Q4), and an index of a codeword corresponding to the second PMI is floor(I1 mod Q5)*Q7 or ceil(I1 mod Q5)*Q7; or an index of a codeword corresponding to the second PMI is floor(I1*Q4) or ceil(I1*Q4), and an index of a codeword corresponding to the first PMI is floor(I1 mod Q5)*Q7 or ceil(I1 mod Q5)*Q7. Q7=1.

An index of a codeword corresponding to the first PMI is floor(I1*Q6/S2) or ceil(I1*Q6/S2), and an index of a codeword corresponding to the second PMI is floor(I1 mod Q8)*Q7 or ceil(I1 mod Q8)*Q7, where Q7=floor($N_2$*$O_2$/S3) or Q7=ceil($N_2$*$O_2$/S3), and Q6=floor($N_1$*$O_1$/Q5) or Q6=ceil($N_1$*$O_1$/Q5); or an index of a codeword corresponding to the second PMI is floor(I1*Q6/S2) or ceil(I1*Q6/S2), and an index of a codeword corresponding to the first PMI is floor(I1 mod Q8)*Q7 or ceil(I1 mod Q8)*Q7, where Q7=floor($N_1$*$O_1$/S3) or Q7=ceil($N_1$*$O_1$/S3), and Q6=floor($N_2$*$O_2$/Q5) or Q6=ceil(N2*$O_2$/Q5).

I1/Q5 is floor(I1/Q5) or ceil(I1/Q5).

S3=2 or S3=4.

An index of a codeword corresponding to the second PMI is floor(Q7*I1,2) or ceil(Q7*I1,2), and an index of a codeword corresponding to the first PMI is floor(Q8*I1,2+i1,1*Q5) or ceil(Q8*I1,2+i1,1*Q5); or an index of a codeword corresponding to the first PMI is floor(Q7*I1,2) or ceil(Q7*I1,2), and an index of a codeword corresponding to the second PMI is floor(Q8*I1,2+i1,1*Q5) or ceil(Q8*I1,2+i1,1*Q5).

The fourth joint index $I_{RI//second\ PMI}$ and the second PMI I1,2 have the following correspondence and meet the following rule:

| $I_{RI//second\ PMI}$ | RI | I1,2 |
|---|---|---|
| 0 to Y0 | 1 | $I_{RI//second\ PMI}$ |
| Y0 + 1 to Y1 | 2 | $I_{RI//second\ PMI}$-Y0-1 |
| Y1 + 1 to Y2 | 3 | $I_{RI//second\ PMI}$-Y1-1 |
| Y2 + 1 to Y3 | 4 | $I_{RI//second\ PMI}$-Y2-1 |

The first joint index I1 and the second joint index $I_{RI/first\ PMI/second\ PMI}$ meet the following rule:

| $I_{RI/first\ PMI/second\ PMI}$ | RI | I1 |
|---|---|---|
| 0 to Y0 | 1 | $I_{RI/first\ PMI/second\ PMI}$ |
| Y0 + 1 to Y1 | 2 | $I_{RI/first\ PMI/second\ PMI}$-(Y0 + 1) |
| Y1 + 1 to Y2 | 3 | $I_{RI/first\ PMI/second\ PMI}$-(Y1 + 1) |
| Y2 + 1 to Y3 | 4 | $I_{RI/first\ PMI/second\ PMI}$-(Y2 + 1) |

Y0 + 1 is $I_{RI/first\ PMI/total\ quantity\ of\ all\ states\ of\ the\ second\ PMI}$ when a rank is 1;
Y1 + 1 is $I_{RI/first\ PMI/total\ quantity\ of\ all\ states\ of\ the\ second\ PMI}$ when the rank is 2;
Y2 + 1 is $I_{RI/first\ PMI/total\ quantity\ of\ all\ states\ of\ the\ second\ PMI}$ when the rank is 3; and
Y3 + 1 is $I_{RI/first\ PMI/total\ quantity\ of\ all\ states\ of\ the\ second\ PMI}$ when the rank is 4.

When the rank is 1, Codebook-Subset-SelectionConfig is a configuration 1, and when the third PMI is 2 bits, serial numbers of codewords that are of W2 and that are corresponding to the third PMI are 0 to 3; or when the third PMI is 1 bit, used serial numbers of codewords are 0 and 2; or when Codebook-Subset-SelectionConfig is a configuration 2, and the third PMI is 2 bits, serial numbers of codewords that are of W2 and that are corresponding to the third PMI are 0, 2, 20, and 22, or 1, 3, 21, and 23, or 0 to 3, or 4, 6, 16, and 18, or 5, 7, 17, and 19, or 0, 2, 4, and 6, or 16, 18, 20, and 22, or 1, 3, 5, and 7, or 17, 19, 21, and 23; or when Codebook-Subset-SelectionConfig is a configuration 3, and the third PMI is 2 bits, serial numbers of codewords that are of W2 and that are corresponding to the third PMI are 0, 2, 28, and 30, or 1, 3, 29, and 31, or 0 to 3, or 0, 2, 8, and 10, or 1, 3, 9, and 11, or 0, 2, 20, and 22, or 1, 3, 21, and 23; or when Codebook-Subset-SelectionConfig is a configuration 4, and the third PMI is 2 bits, codewords of W2 that are corresponding to the third PMI are 0, 2, 8, and to, or 1, 3, 9, and 11, where the codewords of W2 are:

$$W_2 \in C_2 = \left\{ \frac{1}{\sqrt{x}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\}$$

$Y \in \{\tilde{e}_1, \tilde{e}_2, \tilde{e}_3, \tilde{e}_4\tilde{e}_5, \tilde{e}_6, \tilde{e}_7, \tilde{e}_2\}$, where
four state $$\frac{1}{\sqrt{x}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix}$$

corresponding to a number $\tilde{e}_1$ of a codeword corresponding to W2 are numbered from 0 to 3, four states of $\tilde{e}_2$ are then sequentially numbered from 4 to 7, four states of $\tilde{e}_3$ are numbered from 8 to 11, four states of $\tilde{e}_4$ are numbered from 12 to 15, four states of $\tilde{e}_5$ are numbered from 6 to 19, four states of $\tilde{e}_6$ are numbered from 20 to 23, four states of $\tilde{e}_7$ are numbered from 24 to 27, and four states of $\tilde{e}_8$ are numbered from 28 to 31, where x is a parameter related to a quantity of antenna ports.

S1=2 or 3 or S1=4; or
S2=1 or S2=2 or 3;
Q5=2, 3, 4, 6 or 8 or S3=2, 3, 4, or 8; and
Q5, Q6, and Q7 are related to N1, N2, O1, and O2 and/or related to quantities of bits of the first PMI and the second PMI; or Q5, Q6, and Q7 are related to a feedback mode or related to a configuration mode.

S2 and S3 are related to codebook subset selection configuration information and/or the quantity of antenna ports and/or an over-sampling factor.

When Codebook-Subset-SelectionConfig is the configuration 1, S2=1, and when Codebook-Subset-SelectionConfig is the configurations 2 to 4, 82=2; or when Codebook-Subset-SelectionConfig is the configuration 1, S2=2, and when Codebook-Subset-SelectionConfig is the configurations 2 to 4, S2=4; or when Codebook-Subset-SelectionConfig is the configuration 1, S3=1, and when Codebook-Subset-SelectionConfig is the configurations 2 to 4, S3=2; or when Codebook-Subset-SelectionConfig is the configuration 1, S3=2, and when Codebook-Subset-SelectionConfig is the configurations 2 to 4, S3=4.

Q5=2, 3, 4, 6, or 8, and S1=2 or S1=4, or S3=2, 4, or 8.

When Codebook-Subset-SelectionConfig is the configuration 1, S2=1, and when Codebook-Subset-SelectionConfig is the configurations 2 to 4, S2=2; or when Codebook-Subset-SelectionConfig is the configuration 1, S3=2, and when Codebook-Subset-SelectionConfig is the configurations 2 to 4, S3=4.

In this embodiment of the present invention, optionally, Q5=2, 3, 4, 6, or 8, and S1=2 or S1=4, or S3=2, 4, or 8.

When Codebook-Subset-SelectionConfig is the configuration 1, S2=1, and when Codebook-Subset-SelectionConfig is the configurations 2 to 4, S2=2; or when Codebook-Subset-SelectionConfig is the configuration 1, S3=2, and when Codebook-Subset-SelectionConfig is the configurations 2 to 4, S3=4.

Codebook-Subset-SelectionConfig is configuration information for performing subset restriction on a codeword of W2. As shown in FIG. 6, there are four configurations in total in FIG. 6. Eight grids in each configuration correspond to eight vectors obtained after performing a Kronecker product on codewords in two dimensions. Numbers 0 to 3 in a horizontal direction correspond to numbers of four DFT vectors in $\tilde{X}_1^{i_{1,1}}$, and numbers 0 to 2 in a vertical direction correspond to numbers of two DFT vectors in $\tilde{X}_2^{i_{1,2}}$. $S_1$ indicates a quantity of DFT vectors that stagger two codewords of adjacent numbers in $\tilde{X}_1^{i_{1,1}}$, and $S_2$ indicates a quantity of DFT vectors that stagger two codewords of adjacent numbers in $\tilde{X}_2^{i_{1,2}}$.

Optionally, the first CSI is CSI corresponding to a CSI process, and includes at least two of a first CSI reporting type, a second CSI reporting type, a third CSI reporting type, or a fourth CSI reporting type.

The reporting types are CSI content reported at a same moment.

The first CSI reporting type includes a rank indicator RI, the second CSI reporting type includes a first broadband PMI and a second broadband PMI or an index jointly generated based on the first broadband PMI and the second broadband PMI, the third CSI reporting type includes a third broadband PMI and a broadband channel quality indicator CQI, and the third broadband PMI indicates an index of a codebook included in W2; or the first CSI reporting type includes an RI and a first broadband PMI or an index jointly generated based on the RI and the first broadband PMI, the second CSI reporting type includes a second broadband PMI, and the third CSI reporting type includes a third broadband PMI and a broadband CQI; or the first CSI reporting type includes an RI and a second broadband PMI or a joint index of the RI and the second broadband PMI, the second CSI reporting type includes a first broadband PMI, and the third CSI reporting type includes a third broadband PMI and a broadband CQI; or the first CSI reporting type includes an RI and a fourth broadband PMI, the second CSI reporting type includes a fifth broadband PMI, the third CSI reporting type includes a third broadband PMI and a broadband CQI, the fourth broadband PMI is a minimum value of a first broadband PMI and a second broadband PMI, and the fifth broadband PMI is a maximum value of the first broadband PMI and the second broadband PMI; or the first CSI reporting type includes an RI and a first broadband PMI or a joint index of the RI and the first broadband PMI, and the second CSI reporting type includes a second broadband PMI, a third broadband PMI, and a broadband CQI; or the first CSI reporting type includes an RI and a second broadband PMI or a joint index of the RI and the second broadband PMI, and the second CSI reporting type includes a first broadband PMI, a third broadband PMI, and a broadband CQI; or the first CSI reporting type includes an RI and a fourth broadband PMI, and the second CSI reporting type includes a fifth broadband PMI, a third broadband PMI, and a broadband CQI; or the first CSI reporting type includes an RI, the second CSI reporting type includes a first broadband PMI, the third CSI reporting type includes a second broadband PMI, and the fourth CSI includes a third broadband PMI and a CQI; or the first CSI reporting type includes an RI, the second CSI reporting type includes a first broadband PMI, and the third CSI reporting type includes a second broadband PMI, a third broadband PMI, and a broadband CQI; or the first CSI reporting type includes an RI, the second CSI reporting type includes an indication parameter of a codebook configuration manner, the third CSI reporting type includes a first broadband PMI and a second broadband PMI, and the codebook configuration indication parameter is used to indicate a codebook aggregation manner; or the first CSI reporting type includes an RI and an indication parameter of a configuration manner, and the second CSI reporting type includes a second broadband PMI, a third broadband PMI, and a broadband CQI.

The first CSI further includes the fourth CSI reporting type. The fourth CSI reporting type includes a third broadband PMI and a broadband CQI.

A first CSI reporting period is longer than a second CSI reporting period, and the second CSI reporting period is longer than a third CSI reporting period; or a first CSI reporting period is longer than a second CSI reporting period; or a first CSI reporting period is longer than a second CSI reporting period, the second CSI reporting period is longer than a third CSI reporting period, and the third CSI reporting period is longer than a fourth CSI reporting period.

The first CSI reporting period corresponds to the first CSI reporting type, the second CSI reporting period corresponds to the second CSI reporting type, and the third CSI reporting period corresponds to the third CSI reporting type.

Content included in the CSI reporting type is related to a Codebook-Subset-SelectionConfig manner.

Different states of a PTI indicate whether broadband reporting or subband reporting is used next to report the first PMI and the second PMI or whether the first PMI or the second PMI is reported next.

The first CSI is CSI corresponding to a CSI process, and includes at least three of a first CSI reporting type, a second CSI reporting type, a third CSI reporting type, a fourth CSI reporting type, a fifth CSI reporting type, a sixth CSI reporting type, or a seventh CSI reporting type.

The reporting types are CSI content reported at a same moment, and each reporting type corresponds to a reporting period.

The first CSI reporting type includes a PTI and an RI, the second CSI reporting type includes a first broadband PMI and a second broadband PMI or an index jointly generated based on the first broadband PMI and the second broadband PMI, the third CSI reporting type includes a third broadband PMI and a broadband channel quality indicator CQI, and the fourth CSI reporting type includes a third subband PMI and a subband CQI. When PTI=0, the second CSI reporting type and the third CSI reporting type are reported next; or when PTI=1, the second CSI reporting type and the fourth CSI reporting type are reported next.

Alternatively, the first CSI reporting type includes a PTI and an RI, the second CSI reporting type includes a first broadband PMI and a second broadband PMI or an index jointly generated based on the first broadband PMI and the second broadband PMI, the third CSI reporting type includes a third broadband PMI and a broadband channel quality indicator CQI, the fourth CSI reporting type includes a third subband PMI and a subband CQI, the fifth CSI reporting type includes the second broadband PMI and the third broadband PMI, and the sixth CSI reporting type includes the first broadband PMI and the third broadband PMI. When the PTI is in a first state, the second CSI reporting type and the third CSI reporting type are reported next; when the PTI is in a second state, the fifth CSI reporting type and the fourth CSI reporting type are reported next; or when the PTI is in a third state, the sixth CSI reporting type and the fourth CSI reporting type are reported next.

Alternatively, the first CSI reporting type includes a PTI and an RI, the second CSI reporting type includes a first broadband PMI and a second broadband PMI or an index jointly generated based on the first broadband PMI and the second broadband PMI, the third CSI reporting type includes a third broadband PMI and a broadband channel quality indicator CQI, the fourth CSI reporting type includes a third subband PMI and a subband CQI, the fifth CSI reporting type includes the first broadband PMI and a second subband PMI, the sixth CSI reporting type includes the second broadband PMI and the third subband PMI, and the seventh CSI reporting type includes the second subband PMI and the third subband PMI. When the PTI is in a first state, the second CSI reporting type and the third CSI reporting type are reported next; when the PTI is in a second state, the fifth CSI reporting type and the fourth CSI reporting type are reported next; when the PTI is in a third state, the sixth CSI reporting type and the fourth CSI reporting type are reported next; or when the PTI is in a fourth state, the seventh CSI reporting type and the fourth CSI reporting type are reported next.

That the terminal sends the first CSI includes the following:

The terminal periodically sends the first CSI.

The method further includes the following.

The terminal receives a reporting indication sent by the base station, and sends an RI, a CQI, and one of the first PMI and the second PMI based on the reporting indication at a non-periodical reporting moment.

A subframe interval between a subframe for sending the first CSI and a reference subframe corresponding to the subframe for sending the first CSI is related to an antenna configuration and/or an over-sampling factor.

The subframe interval is related to a quantity of codebooks included in a codebook restriction subset of W1, and the codebook restriction subset is a set of codebooks, in W1, that can be indicated by the first PMI and the second PMI.

The subframe interval is related to K.

The first CSI is specific to a first-type CSI process.

The method further includes the following:

The terminal obtains the second CSI, where the second CSI is specific to a second-type CSI process.

The terminal determines that the first CSI and the second CSI need to be sent in a same time unit, and sends only the first CSI when a priority of the first CSI is higher than a priority of the second CSI.

That the terminal determines that the priority of the first CSI is higher than the priority of the second CSI includes the following.

The terminal determines, according to at least one piece of the following information, that the priority of the first CSI is higher than the priority of the second CSI a CSI reporting type, a carrier number of a carrier corresponding to CSI, a CSI process corresponding to the CSI, or an attribute of a reference signal corresponding to the CSI.

That the terminal determines, based on the attribute of the reference signal corresponding to the CSI, that the priority of the first CSI is higher than the priority of the second CSI includes the following.

If a reference signal corresponding to one piece of CSI of the first CSI and the second CSI is precoded and a reference signal corresponding to the other piece of CSI is not precoded, the terminal determines, based on an attribute of whether the reference signal corresponding to the CSI is precoded, that the priority of the first CSI is higher than the priority of the second CSI; or if reference signals respectively corresponding to the first CSI and the second CSI are both precoded, the terminal determines, according to attributes of sub-reference signals included in the precoded reference signals corresponding to the CSI, that the priority of the first CSI is higher than the priority of the second CSI.

The CSI reporting type corresponding to the first CSI is the same as or different from a CSI reporting type corresponding to the second CSI.

The first CSI further includes an RI and a CQI.

When a quantity of sub-reference signals included in the reference signal corresponding to the second CSI is greater than 1, the second CSI includes an index of a sub-reference signal resource, and an RI, a PMI, and a CQI that are of a sub-reference signal corresponding to the index; or when a quantity of sub-reference signals included in the reference signal corresponding to the second CSI is greater than 1, the second CSI includes an RI, a PMI, and a CQI.

A priority of the first-type CSI process is higher than a priority of the second-type CSI process.

The quantity of sub-reference signals included in the reference signal corresponding to the second CSI is greater than 1 (A>B1); or the quantity of sub-reference signals included in the reference signal corresponding to the second CSI is equal to 1 (A>B2).

The method further includes the following.

The terminal obtains the third CSI, where the third CSI is specific to the second-type CSI process.

If the quantity of sub-reference signals included in the reference signal corresponding to the second CSI is greater than 1, and a quantity of sub-reference signals included in a reference signal corresponding to the third CSI is equal to 1, the priority of the second CSI is higher than a priority of the third CSI; or if the quantity of sub-reference signals included in the reference signal corresponding to the second CSI is greater than 1, and a quantity of sub-reference signals included in a reference signal corresponding to the third CSI is equal to 1, a priority of the third CSI is higher than the priority of the second CSI.

The first CSI is specific to a second-type CSI process and the first-type CSI process.

The method further includes the following.

The terminal obtains the second CSI, where the second CSI is specific to a first-type CSI process and the second-type CSI process.

The terminal determines that the first CSI and the second CSI need to be sent in a same time unit, and sends only the first CSI when a priority of the first CSI is higher than a priority of the second CSI.

That the terminal determines that the priority of the first CSI is higher than the priority of the second CSI includes the following.

The terminal determines, according to at least one piece of the following information, that the priority of the first CSI is higher than the priority of the second CSI: a CSI reporting type, a carrier number of a carrier corresponding to CSI, a CSI process corresponding to the CSI, or an attribute of a reference signal corresponding to the CSI.

That the terminal determines, based on the attribute of the reference signal corresponding to the CSI, that the priority of the first CSI is higher than the priority of the second CSI includes the following.

If a reference signal corresponding to one piece of CSI of the first CSI and the second CSI is precoded and a reference signal corresponding to the other piece of CSI is not precoded, the terminal determines, based on an attribute of whether the reference signal corresponding to the CSI is precoded, that the priority of the first CSI is higher than the priority of the second CSI; or if reference signals respectively corresponding to the first CSI and the second CSI are both precoded, the terminal determines, according to attributes of sub-reference signals included in the precoded reference signals corresponding to the CSI, that the priority of the first CSI is higher than the priority of the second CSI.

The first CSI further includes an RI and a CQI.

When a quantity of sub-reference signals included in the reference signal corresponding to the second CSI is greater than 1, the second CSI includes an index of a sub-reference signal resource, and an RI, a PMI, and a CQI that are of a sub-reference signal corresponding to the index; or when a quantity of sub-reference signals included in the reference signal corresponding to the second CSI is greater than 1, the second CSI includes an RI, a PMI, and a CQI.

The CSI reporting type corresponding to the first CSI is the same as or different from a CSI reporting type corresponding to the second CSI.

A priority of the second-type CSI process is higher than a priority of the first-type CSI process.

The quantity of sub-reference signals included in the reference signal corresponding to the second CSI is greater than 1 (A<B1); or the quantity of sub-reference signals included in the reference signal corresponding to the second CSI is equal to 1 (A<B2).

The method further includes the following.

The terminal obtains the third CSI, where the third CSI is specific to the second-type CSI process.

If the quantity of sub-reference signals included in the reference signal corresponding to the second CSI is greater than 1, and a quantity of sub-reference signals included in a reference signal corresponding to the third CSI is equal to 1, the priority of the second CSI is higher than a priority of the third CSI, and the priority of the third CSI is higher than the priority of the first CSI (B2>B1>A); or if the quantity of sub-reference signals included in the reference signal corresponding to the second CSI is greater than 1, and a quantity of sub-reference signals included in a reference signal corresponding to the third CSI is equal to 1, a priority of the third CSI is higher than the priority of the second CSI, and the priority of the second CSI is higher than the priority of the first CSI (B1>B2>A).

The method further includes the following.

The terminal obtains the third CSI, where the third CSI is specific to the second-type CSI process.

If the quantity of sub-reference signals included in the reference signal corresponding to the second CSI is greater than 1, and a quantity of sub-reference signals included in a reference signal corresponding to the third CSI is equal to 1, the priority of the second CSI is higher than the priority of the first CSI, and the priority of the first CSI is higher than a priority of the third CSI (B2>A>B1); or if the quantity of sub-reference signals included in the reference signal corresponding to the second CSI is greater than 1, and a quantity of sub-reference signals included in a reference signal corresponding to the third CSI is equal to 1, a priority of the third CSI is higher than the priority of the first CSI, and the priority of the first CSI is higher than the priority of the third CSI (B1>A>B2).

The method further includes the following.

If the quantity of sub-reference signals included in the reference signal corresponding to the second CSI and a quantity of sub-reference signals included in a reference signal corresponding to the third CSI both are greater than 1, the second CSI includes an index of the sub-reference signal, and the third CSI does not include an index of the sub-reference signal, a priority of a reporting type corresponding to the second CSI is higher than a priority of a reporting type corresponding to the third CSI.

The method further includes the following.

If the quantity of sub-reference signals included in the reference signal corresponding to the second CSI is greater than 1, and a quantity of sub-reference signals included in a reference signal corresponding to the third CSI is equal to 1, the priority of the second CSI is higher than a priority of the third CSI.

The method further includes the following.

If the quantity of sub-reference signals included in the reference signal corresponding to the second CSI is greater than 1, and the second CSI includes an index of a sub-reference signal resource, the priority of the second CSI is higher than the priority of the first CSI.

Figure 4B:
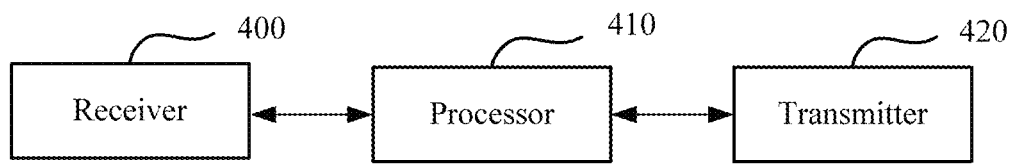
FIG. 4B is another schematic diagram of a CSI measurement and feedback apparatus according to an embodiment of the present invention.

As shown in FIG. 4B, an embodiment of the present invention provides a CSI measurement and feedback apparatus. The apparatus includes a receiver 400, a processor 410, a transmitter 420.

The receiver 400 is configured to receive a reference signal sent by a base station.

The processor 410 is configured to perform channel measurement based on the reference signal, to obtain first CSI carrying a target index, where the target index is a first joint index, and the first joint index is an index jointly generated based on a first precoding matrix indicator PMI and a second PMI; or the target index is a second joint index, and the second joint index is an index jointly generated based on a rank indicator RI, the first PMI, and the second PMI; or the target index is the first PMI and the second PMI; or the target index is a third joint index and the second PMI, and the third joint index is an index jointly generated based on the first PMI and the RI; or the target index is a fourth joint index and the first PMI, the fourth joint index is an index jointly generated based on the second PMI and the RI, the first PMI indicates an index of a codeword in a first dimension in W1, and the second PMI indicates an index of a codeword in a second dimension in W1.

The transmitter 420 is configured to send the first CSI.

Figure 5A:
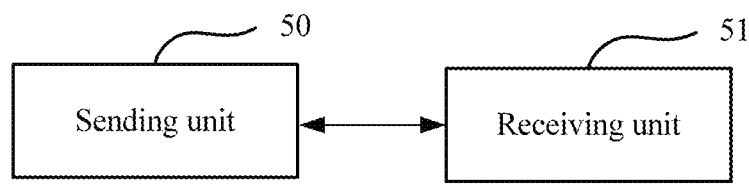
FIG. 5A is a schematic diagram of a CSI measurement and feedback apparatus according to an embodiment of the present invention.

As shown in FIG. 5A, an embodiment of the present invention provides a CSI measurement and feedback apparatus. The apparatus includes a sending unit 50 and a receiving unit 51.

The sending unit 50 is configured to send a reference signal to a terminal.

The receiving unit 51 is configured to receive first CSI that is obtained by the terminal by performing channel measurement based on the reference signal, where the first CSI carries a target index, the target index is a first joint index, and the first joint index is an index jointly generated based on a first precoding matrix indicator PMI and a second PMI; or the target index is a second joint index, and the second joint index is an index jointly generated based on a rank indicator RI, the first PMI, and the second PMI; or the target index is the first PMI and the second PMI; or the target index is a third joint index and the second PMI, and the third joint index is an index jointly generated based on the first PMI and the RI; or the target index is a fourth joint index and the first PMI, the fourth joint index is an index jointly generated based on the second PMI and the RI, the first PMI indicates an index of a codeword in a first dimension in W1, and the second PMI indicates an index of a codeword in a second dimension in W1.

W1 meets the following rule.
W=W1*W2, and $$W_1(i_{1,1}, i_{1,2}) = \begin{bmatrix} \tilde{X}_1^{i_{1,1}} \otimes \tilde{X}_2^{i_{1,2}} & 0 \\ 0 & \tilde{X}_1^{i_{1,1}} \otimes \tilde{X}_2^{i_{1,2}} \end{bmatrix},$$

where

W is a precoding matrix; $\tilde{X}_1^{i_{1,1}}$ is a codeword in the first dimension, and a quantity of columns of $\tilde{X}_1^{i_{1,1}}$ is a quantity $N_1$ of antenna ports in the first dimension; $\tilde{X}_2^{i_{1,2}}$ is a codeword in the second dimension, and a quantity of columns of $\tilde{X}_2^{i_{1,2}}$ is a quantity $N_2$ of antenna ports in the second dimension; $i_{1,1}$ is an index of the codeword in the first dimension, and $i_{1,2}$ is an index of the codeword in the second dimension; W2 corresponds to a third PMI; ⊗ is a Kronecker product; $\tilde{X}_1^{i_{1,1}}$ includes discrete Fourier transform DFT column vectors, a form of the column vector included in $\tilde{X}_1^{i_{1,1}}$ is $v_{m_1}$, and $v_{m_1}$ meets the following rule:

$$v_{m_1} = \begin{bmatrix} 1 & e^{j\frac{2\pi m_1}{O_1 N_1}} & \ldots & e^{j\frac{2\pi m_1(N_1-1)}{O_1 N_1}} \end{bmatrix}^t, 0 \le m_1 \le N_1 \cdot O_1 - 1,$$

where $O_1$ is an over-sampling factor in the first dimension; and a form of a column vector included in $\tilde{X}_2^{i_{1,2}}$ is $v_{m_2}$, and $v_{m_2}$ meets the following rule:

$$u_{m_2} = \begin{bmatrix} 1 & e^{j\frac{2\pi m_2}{O_2 N_2}} & \ldots & e^{j\frac{2\pi m_2(N_2-1)}{O_2 N_2}} \end{bmatrix}^t, 0 \le m_2 \le N_2 \cdot O_2 - 1,$$

where $O_2$ is an over-sampling factor in the second dimension.

The first PMI is related or unrelated to the second PMI, or the third joint index is related or unrelated to the second PMI, or the fourth joint index is related or unrelated to the first PMI. A set of codewords in the first dimension in W1 that correspond to at least M different first PMIs existing in all first PMIs is different from a set of codewords in the second dimension in W1 that are corresponding to second PMIs, where a Kronecker product is performed on the codeword in the first dimension and the codeword in the second dimension; or a set of codewords in the second dimension in W1 that are corresponding to at least M different second PMIs existing in all second PMIs is different from a set of codewords in the first dimension in W1 that are corresponding to first PMIs, where a Kronecker product is performed on the codeword in the first dimension and the codeword in the second dimension.

M is an integer greater than or equal to 2.

M is related to the over-sampling factor $O_1$ in the first dimension and/or the quantity $N_1$ of antennas in the first dimension, or M is equal to a total quantity of all states of the first PMI.

Alternatively, M is related to the over-sampling factor $O_2$ in the second dimension and/or the quantity $N_2$ of antennas in the second dimension, or M is equal to a total quantity of all states of the second PMI.

If the first target index I1 is the first joint index, an index of a codeword corresponding to the first PMI is $I1*Q_1$, and an index of a codeword corresponding to the second PMI is $I1*Q_2$. $Q_1$ and $Q_2$ are integers greater than or equal to 1.

$Q_1$ is related to a total quantity of antennas in the first dimension and/or the over-sampling factor in the first dimension, and $Q_2$ is related to a total quantity of antennas in the second dimension and/or the over-sampling factor in the second dimension.

$Q_1=Q_2=1$, or $Q_1=Q_2=2$, or $Q_1=Q_2=4$.

The apparatus is applicable to a scenario of $N_1=N_2$ or a scenario of $N_1*Q_1=N2*Q_2$, $N_1$ is the total quantity of antennas in the first dimension, $N_2$ is the total quantity of antennas in the second dimension, $Q_1$ is the over-sampling factor in the first dimension, and $Q_2$ is the over-sampling factor in the second dimension.

If the first target index I1 is the first joint index, an index of a codeword corresponding to the first PMI is floor(I1 mod Q5)*Q6/S2 or ceil(I1 mod Q5)*Q6/S2, and an index of a codeword corresponding to the second PMI is floor(I1/Q5)*Q7 or ceil(I1/Q5)*Q7; or an index of a codeword corresponding to the second PMI is floor(I1 mod Q5)*Q6/S2 or ceil(I1 mod Q5)*Q6/S2, and an index of a codeword corresponding to the first PMI is floor(I1/Q5)*Q7 or ceil(I1/Q5)*Q7.

Q7=floor($N_2*O_2$/S3) or Q7=ceil($N_2*O_2$/S3), Q6=floor($N_1*O_1$/Q5) or Q6=ceil($N_1*O_1$/Q5), and Q5, Q6, Q7, S2, and S3 are positive integers.

An index of a codeword corresponding to the first PMI is floor(I1/Q5)*Q6/S1+floor(I1 mod Q5)*Q6/S2, ceil(I1/Q5)*Q6/S1+ceil(I1 mod Q5)*Q6/S2, floor(I1/Q5)*Q6/S1+ceil(I1 mod Q5)*Q6/S2, or ceil(I1/Q5)*Q6/S1+floor(I1 mod Q5)*Q6/S2; and an index of a codeword corresponding to the second PMI is floor(I1/Q5)*Q7 or ceil(I1/Q5)*Q7, where Q7=floor($N_2*O_2$/S3) or Q7=ceil($N_2*O_2$/S3), Q6=floor($N_1*O_1$/Q5) or Q6=ceil($N_1*O_1$/Q5), and Q5, Q6, Q7, S1, S2, and S3 are positive integers; or an index of a codeword corresponding to the second PMI is floor(I1/Q5)*Q6/S1+floor(I1 mod Q5)*Q6/S2, ceil(I1/Q5)*Q6/S1+ceil(I1 mod Q5)*Q6/S2, floor(I1/Q5)*Q6/S1+ceil(I1 mod Q5)*Q6/S2, or ceil(I1/Q5)*Q6/S1+floor(I1 mod Q5)*Q6/S2; and an index of a codeword corresponding to the first PMI is floor(I1/Q5)*Q7 or ceil(I1/Q5)*Q7.

Q7=floor($N_1*O_1$/S3) or Q7=ceil($N_1*O_1$/S3), Q6=floor($N_2*O_2$/Q5) or Q6=ceil($N_2*O_2$/Q5), and Q5, Q6, Q7, S2, and S3 are positive integers.

The index of the codeword corresponding to the first PMI is $i_{1,1}$, and the index of the codeword corresponding to the second PMI is $i_{1,2}$; and in this case, $$i_{1,d_1} = \left\lfloor \frac{I_1}{Q5} \right\rfloor \times \frac{N_{d_1} O_{d_1}}{2Q5S2} + \text{mod}(I_1, Q5) \times \frac{N_{d_1} O_{d_1}}{Q5s_1},$$

$$i_{1,d_2} = \left\lfloor \frac{I_1}{Q5} \right\rfloor \times \frac{N_{d_2} O_{d_2}}{2S2},$$

$$(d_1, d_2) = \begin{cases} (1, 2) & \text{if } N_1 \geq N_2 \\ (2, 1) & \text{others} \end{cases}, \text{ and}$$

$$Q5 = \begin{cases} 4 & \text{for } N_{d_1} = 4/2 \\ 3 & \text{for } N_{d_1} = 3 \\ 8 & \text{for } N_{d_1} = 8 \end{cases}.$$

An index of a codeword corresponding to the first PMI is floor(($I_1$/Q5) mod 2)*Q6/S1+floor(I1 mod Q5)*Q6/S2, or an index of a codeword corresponding to the first PMI is floor(($I_1$/Q5) mod 2)*Q6/S1+ceil(I1 mod Q5)*Q6/S2, or an index of a codeword corresponding to the first PMI is ceil(($I_1$/Q5) mod 2)*Q6/S1+ceil(I1 mod Q5)*Q6/S2, or an index of a codeword corresponding to the first PMI is ceil(($I_1$/Q5) mod 2)*Q6/S1+floor(I1 mod Q5)*Q6/S2; and an index of a codeword corresponding to the second PMI is ceil(I1/Q5)*Q7, or an index of a codeword corresponding to the second PMI is floor(I1/Q5)*Q7, where Q7=floor($N_2*O_2$/S3) or Q7=ceil($N_2*O_2$/S3), Q6=floor($N_1*O_1$/Q5) or Q6=ceil($N_1*O_1$/Q5), and I1/Q5 is floor(I1/Q5) or ceil(I1/Q5); or an index of a codeword corresponding to the second PMI is floor((I1/Q5) mod 2)*Q6/S1+floor(I1 mod Q5)*Q6/S2, or an index of a codeword corresponding to the second PMI is floor((I1/Q5) mod 2)*Q6/S1+ceil(I1 mod Q5)*Q6/S2, or an index of a codeword corresponding to the second PMI is ceil((I1/Q5) mod 2)*Q6/S1+ceil(I1 mod Q5)*Q6/S2, or an index of a codeword corresponding to the second PMI is ceil(($I_1$/Q5) mod 2)*Q6/S1+floor(I1 mod Q5)*Q6/S2; and an index of a codeword corresponding to the first PMI is ceil(I1/Q5)*Q7, or an index of a codeword corresponding to the first PMI is floor(I1/Q5)*Q7, where Q7=floor($N_1*O_1$/S3) or Q7=ceil($N_1*O_1$/S3), and Q6=floor($N_2*O_2$/Q5) or Q6=ceil($N_2*O_2$/Q5).

I1/Q5 is floor(I1/Q5) or ceil(I1/Q5).

An index of a codeword corresponding to the first PMI is floor(I1/Q5)*Q6/S1 or ceil(I1/Q5)*Q6/S1, and an index of a codeword corresponding to the second PMI is floor(($I_1$/Q5)*Q6/S1)+ceil(I1 mod Q5)*Q6/S2), floor(($I_1$/Q5)*Q6/S1)+floor(I1 mod Q5)*Q6/S2), ceil(($I_1$/Q5)*Q6/S1)+floor(I1 mod Q5)*Q6/S2), or ceil(($I_1$/Q5)*Q6/S1)+ceil(I1 mod Q5)*Q6/S2); or an index of a codeword corresponding to the second PMI is floor(I1/Q5)*Q6/S1 or ceil(I1/Q5)*Q6/S1, and an index of a codeword corresponding to the first PMI is floor(($I_1$/Q5)*Q6/S1)+ceil(I1 mod Q5)*Q6/S2), floor(($I_1$/Q5)*Q6/S1)+floor(I1 mod Q5)*Q6/S2), ceil(($I_1$/Q5)*Q6/S1)+floor(I1 mod Q5)*Q6/S2), or ceil(($I_1$/Q5)*Q6/S1)+ceil(I1 mod Q5)*Q6/S2), where Q6=floor(N1*$Q_1$/Q5) or ceil(N1*$Q_1$/Q5). As an embodiment, where an index of a codeword corresponding to the first PMI is I1*Q6/S2, and an index of a codeword corresponding to the second PMI is I1.

S2=8.

An index of a codeword corresponding to the first PMI is floor(h*Q4) or ceil(I1*Q4), and an index of a codeword corresponding to the second PMI is floor(I1 mod Q5)*Q7 or ceil(I1 mod Q5)*Q7; or an index of a codeword corresponding to the second PMI is floor(I1*Q4) or ceil(I1*Q4), and an index of a codeword corresponding to the first PMI is floor(I1 mod Q5)*Q7 or ceil(I1 mod Q5)*Q7.

Q7=1.

An index of a codeword corresponding to the first PMI is floor(I1*Q6/S2) or ceil(I1*Q6/S2), and an index of a codeword corresponding to the second PMI is floor(I1 mod Q8)*Q7 or ceil(I1 mod Q8)*Q7, where Q7=floor($N_2*O_2$/S3) or Q7=ceil($N_2*O_2$/S3), and Q6=floor($N_1*O_1$/Q5) or Q6=ceil($N_1*O_1$/Q5); or an index of a codeword corresponding to the second PMI is floor(I1*Q6/S2) or ceil(I1*Q6/S2), and an index of a codeword corresponding to the first PMI is floor(I1 mod Q8)*Q7 or ceil(I1 mod Q8)*Q7, where Q7=floor($N_1*O_1$/S3) or Q7=ceil($N_1*O_1$/S3), and Q6=floor($N_2*O_2$/Q5) or Q6=ceil($N_2*O_2$/Q5).

I1/Q5 is floor(I1/Q5) or ceil(I1/Q5).

S3=2 or S3=4.

An index of a codeword corresponding to the second PMI is floor(Q7*I1,2) or ceil(Q7*I1,2), and an index of a codeword corresponding to the first PMI is floor(Q8*I1,2+i1,1*Q5) or ceil(Q8*I1,2+i1,1*Q5); or an index of a codeword corresponding to the first PMI is floor(Q7*I1,2) or ceil(Q7*I1,2), and an index of a codeword corresponding to the second PMI is floor(Q8*I1,2+i1,1*Q5) or ceil(Q8*I1,2+i1,1*Q5).

The fourth joint index $I_{RI//second\ PMI}$ and the second PMI I1,2 have the following correspondence and meet the following rule:

| $I_{RI//second\ PMI}$ | RI | I1,2 |
|---|---|---|
| 0 to Y0 | 1 | $I_{RI//second\ PMI}$ |
| Y0 + 1 to Y1 | 2 | $I_{RI//second\ PMI\text{-}Y0\text{-}1}$ |
| Y1 + 1 to Y2 | 3 | $I_{RI//second\ PMI\text{-}Y1\text{-}1}$ |
| Y2 + 1 to Y3 | 4 | $I_{RI//second\ PMI\text{-}Y2\text{-}1}$ |

The first joint index I1 and the second joint index $I_{RI/first\ PMI/second\ PMI}$ meet the following rule:

| $I_{RI/first\ PMI/second\ PMI}$ | RI | I1 |
|---|---|---|
| 0 to Y0 | 1 | $I_{RI/first\ PMI/second\ PMI}$ |
| Y0 + 1 to Y1 | 2 | $I_{RI/first\ PMI/second\ PMI}$-(Y0 + 1) |
| Y1 + 1 to Y2 | 3 | $I_{RI/first\ PMI/second\ PMI}$-(Y1 + 1) |
| Y2 + 1 to Y3 | 4 | $I_{RI/first\ PMI/second\ PMI}$-(Y2 + 1) |

Y0 + 1 is $I_{RI/first\ PMI/total\ quantity\ of\ all\ states\ of\ the\ second\ PMI}$ when a rank is 1;
Y1 + 1 is $I_{RI/first\ PMI/total\ quantity\ of\ all\ states\ of\ the\ second\ PMI}$ when the rank is 2;
Y2 + 1 is $I_{RI/first\ PMI/total\ quantity\ of\ all\ states\ of\ the\ second\ PMI}$ when the rank is 3; and
Y3 + 1 is $I_{RI/first\ PMI/total\ quantity\ of\ all\ states\ of\ the\ second\ PMI}$ when the rank is 4.

When the rank is 1, Codebook-Subset-SelectionConfig is a configuration 1, and when the third PMI is 2 bits, serial numbers of codewords that are of W2 and that are corresponding to the third PMI are 0 to 3; or when the third PMI is 1 bit, used serial numbers of codewords are 0 and 2; or when Codebook-Subset-SelectionConfig is a configuration 2, and the third PMI is 2 bits, serial numbers of codewords that are of W2 and that are corresponding to the third PMI are 0, 2, 20, and 22, or 1, 3, 21, and 23, or 0 to 3, or 4, 6, 16, and 18, or 5, 7, 17, and 19, or 0, 2, 4, and 6, or 16, 18, 20, and 22, or 1, 3, 5, and 7, or 17, 19, 21, and 23; or when Codebook-Subset-SelectionConfig is a configuration 3, and the third PMI is 2 bits, serial numbers of codewords that are of W2 and that are corresponding to the third PMI are 0, 2, 28, and 30, or 1, 3, 29, and 31, or 0 to 3, or 0, 2, 8, and 10, or 1, 3, 9, and 11, or 0, 2, 20, and 22, or 1, 3, 21, and 23; or when Codebook-Subset-SelectionConfig is a configuration 4, and the third PMI is 2 bits, codewords of W2 that are corresponding to the third PMI are 0, 2, 8, and to, or 1, 3, 9, and 11, where the codewords of W2 are:

$$W_2 \in C_2 = \left\{ \frac{1}{\sqrt{x}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\}$$

$$Y \in \{\tilde{e}_1, \tilde{e}_2, \tilde{e}_3, \tilde{e}_4\tilde{e}_5, \tilde{e}_6, \tilde{e}_7, \tilde{e}_2\},$$

where
four states $$\frac{1}{\sqrt{x}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix}$$

corresponding to a number $\tilde{e}_1$ of a codeword corresponding to W2 are numbered from 0 to 3, four states of $\tilde{e}_2$ are then sequentially numbered from 4 to 7, four states of $\tilde{e}_3$ are numbered from 8 to 11, four states of $\tilde{e}_4$ are numbered from 12 to 15, four states of $\tilde{e}_5$ are numbered from 16 to 19, four states of $\tilde{e}_6$ are numbered from 20 to 23, four states of $\tilde{e}_7$ are numbered from 24 to 27, and four states of $\tilde{e}_8$ are numbered from 28 to 31, where x is a parameter related to a quantity of antenna ports.

S1=2 or 3 or S1=4; or
S2=1 or S2=2 or 3;
Q5=2, 3, 4, 6 or 8 or S3=2, 3, 4, or 8; and
Q5, Q6, and Q7 are related to N1, N2, O1, and O2 and/or related to quantities of bits of the first PMI and the second PMI; or Q5, Q6, and Q7 are related to a feedback mode or related to a configuration mode.

S2 and S3 are related to codebook subset selection configuration information and/or the quantity of antenna ports and/or an over-sampling factor.

When Codebook-Subset-SelectionConfig is the configuration 1, S2=1, and when Codebook-Subset-SelectionConfig is the configurations 2 to 4, S2=2; or when Codebook-Subset-SelectionConfig is the configuration 1, S2=2, and when Codebook-Subset-SelectionConfig is the configurations 2 to 4, S2=4; or when Codebook-Subset-SelectionConfig is the configuration 1, S3=1, and when Codebook-Subset-SelectionConfig is the configurations 2 to 4, S3=2; or when Codebook-Subset-SelectionConfig is the configuration 1, S3=2, and when Codebook-Subset-SelectionConfig is the configurations 2 to 4, S3=4.

Q5=2, 3, 4, 6, or 8, and 81=2 or S1=4, or S3=2, 4, or 8.
When Codebook-Subset-SelectionConfig is the configuration 1, S2=1, and when Codebook-Subset-SelectionConfig is the configurations 2 to 4, S2=2; or when Codebook-Subset-SelectionConfig is the configuration 1, S3=2, and when Codebook-Subset-SelectionConfig is the configurations 2 to 4, S3=4.

The reporting types are CSI content reported at a same moment.

The first CSI reporting type includes a rank indicator RI, the second CSI reporting type includes a first broadband PMI and a second broadband PMI or an index jointly generated based on the first broadband PMI and the second broadband PMI, the third CSI reporting type includes a third broadband PMI and a broadband channel quality indicator CQI, and the third broadband PMI indicates an index of a codebook included in W2; or the first CSI reporting type includes an RI and a first broadband PMI or an index jointly generated based on the RI and the first broadband PMI, the second CSI reporting type includes a second broadband PMI, and the third CSI reporting type includes a third broadband PMI and a broadband CQI; or the first CSI reporting type includes an RI and a second broadband PMI or a joint index of the RI and the second broadband PMI, the second CSI reporting type includes a first broadband PMI, and the third CSI reporting type includes a third broadband PMI and a broadband CQI; or the first CSI reporting type includes an RI and a fourth broadband PMI, the second CSI reporting type includes a fifth broadband PMI, the third CSI reporting type includes a third broadband PMI and a broadband CQI, the fourth broadband PMI is a minimum value of a first broadband PMI and a second broadband PMI, and the fifth broadband PMI is a maximum value of the first broadband PMI and the second broadband PMI; or the first CSI reporting type includes an RI and a first broadband PMI or a joint index of the RI and the first broadband PMI, and the second CSI reporting type includes a second broadband PMI, a third broadband PMI, and a broadband CQI; or the first CSI reporting type includes an RI and a second broadband PMI or a joint index of the RI and the second broadband PMI, and the second CSI reporting type includes a first broadband PMI, a third broadband PMI, and a broadband CQI; or the first CSI reporting type includes an RI and a fourth broadband PMI, and the second CSI reporting type includes a fifth broadband PMI, a third broadband PMI, and a broadband CQI; or the first CSI reporting type includes an RI, the second CSI reporting type includes a first broadband PMI, the third CSI reporting type includes a second broadband PMI, and the fourth CSI includes a third broadband PMI and a CQI; or the first CSI reporting type includes an RI, the second CSI reporting type includes a first broadband PMI, and the third CSI reporting type includes a second broadband PMI, a third broadband PMI, and a broadband CQI; or the first CSI reporting type includes an RI, the second CSI reporting type includes an indication parameter of a codebook configuration manner, the third CSI reporting type includes a first broadband PMI and a second broadband PMI, and the codebook configuration indication parameter is used to indicate a codebook aggregation manner; or the first CSI reporting type includes an RI and an indication parameter of a configuration manner, and the second CSI reporting type includes a second broadband PMI, a third broadband PMI, and a broadband CQI.

The first CSI further includes the fourth CSI reporting type. The fourth CSI reporting type includes a third broadband PMI and a broadband CQI.

A first CSI reporting period is longer than a second CSI reporting period, and the second CSI reporting period is longer than a third CSI reporting period; or a first CSI reporting period is longer than a second CSI reporting period; or a first CSI reporting period is longer than a second CSI reporting period, the second CSI reporting period is longer than a third CSI reporting period, and the third CSI reporting period is longer than a fourth CSI reporting period.

The first CSI reporting period corresponds to the first CSI reporting type, the second CSI reporting period corresponds to the second CSI reporting type, and the third CSI reporting period corresponds to the third CSI reporting type.

Content included in the CSI reporting type is related to a Codebook-Subset-SelectionConfig manner.

Different states of a PTI indicate whether broadband reporting or subband reporting is used next to report the first PMI and the second PMI or whether the first PMI or the second PMI is reported next.

The first CSI is CSI corresponding to a CSI process, and includes at least three of a first CSI reporting type, a second CSI reporting type, a third CSI reporting type, a fourth CSI reporting type, a fifth CSI reporting type, a sixth CSI reporting type, or a seventh CSI reporting type.

The reporting types are CSI content reported at a same moment, and each reporting type corresponds to a reporting period.

The first CSI reporting type includes a PTI and an RI, the second CSI reporting type includes a first broadband PMI and a second broadband PMI or an index jointly generated based on the first broadband PMI and the second broadband PMI, the third CSI reporting type includes a third broadband PMI and a broadband channel quality indicator CQI, and the fourth CSI reporting type includes a third subband PMI and a subband CQI. When PTI=0, the second CSI reporting type and the third CSI reporting type are reported next; or when PTI=1, the second CSI reporting type and the fourth CSI reporting type are reported next.

Alternatively, the first CSI reporting type includes a PTI and an RI, the second CSI reporting type includes a first broadband PMI and a second broadband PMI or an index jointly generated based on the first broadband PMI and the second broadband PMI, the third CSI reporting type includes a third broadband PMI and a broadband channel quality indicator CQI, the fourth CSI reporting type includes a third subband PMI and a subband CQI, the fifth CSI reporting type includes the second broadband PMI and the third broadband PMI, and the sixth CSI reporting type includes the first broadband PMI and the third broadband PMI. When the PTI is in a first state, the second CSI reporting type and the third CSI reporting type are reported next; when the PTI is in a second state, the fifth CSI reporting type and the fourth CSI reporting type are reported next; or when the PTI is in a third state, the sixth CSI reporting type and the fourth CSI reporting type are reported next.

Alternatively, the first CSI reporting type includes a PTI and an RI, the second CSI reporting type includes a first broadband PMI and a second broadband PMI or an index jointly generated based on the first broadband PMI and the second broadband PMI, the third CSI reporting type includes a third broadband PMI and a broadband channel quality indicator CQI, the fourth CSI reporting type includes a third subband PMI and a subband CQI, the fifth CSI reporting type includes the first broadband PMI and a second subband PMI, the sixth CSI reporting type includes the second broadband PMI and the third subband PMI, and the seventh CSI reporting type includes the second subband PMI and the third subband PMI. When the PTI is in a first state, the second CSI reporting type and the third CSI reporting type are reported next; when the PTI is in a second state, the fifth CSI reporting type and the fourth CSI reporting type are reported next; when the PTI is in a third state, the sixth CSI reporting type and the fourth CSI reporting type are reported next; or when the PTI is in a fourth state, the seventh CSI reporting type and the fourth CSI reporting type are reported next.

The method further includes the following.

The base station sends a reporting indication to the terminal, so that the terminal sends an RI, a CQI, and one of the first PMI and the second PMI based on the reporting indication at a non-periodical reporting moment.

A subframe interval between a subframe for sending the first CSI and a reference subframe corresponding to the subframe for sending the first CSI is related to an antenna configuration and/or an over-sampling factor.

The subframe interval is related to a quantity of codebooks included in a codebook restriction subset of W1, and the codebook restriction subset is a set of codebooks, in W1, that can be indicated by the first PMI and the second PMI.

The subframe interval is related to K.

The first CSI is specific to a first-type CSI process.

The method further includes the following.

The base station receives the second CSI sent by the terminal, where the second CSI is specific to a second-type CSI process.

The terminal determines that the first CSI and the second CSI need to be sent in a same time unit, and sends only the first CSI when a priority of the first CSI is higher than a priority of the second CSI.

That the priority of the first CSI is higher than the priority of the second CSI may be determined in the following manner: determining, according to at least one piece of the following information, that the priority of the first CSI is higher than the priority of the second CSI: a CSI reporting type, a carrier number of a carrier corresponding to CSI, a CSI process corresponding to the CSI, or an attribute of a reference signal corresponding to the CSI.

That the priority of the first CSI is higher than the priority of the second CSI may be determined in the following manner based on the attribute of the reference signal corresponding to the CSI.

If a reference signal corresponding to one piece of CSI of the first CSI and the second CSI is precoded and a reference signal corresponding to the other piece of CSI is not precoded, the terminal determines, based on an attribute of whether the reference signal corresponding to the CSI is precoded, that the priority of the first CSI is higher than the priority of the second CSI; or if reference signals respectively corresponding to the first CSI and the second CSI are both precoded, the terminal determines, according to attributes of sub-reference signals included in the precoded reference signals corresponding to the CSI, that the priority of the first CSI is higher than the priority of the second CSI.

The CSI reporting type corresponding to the first CSI is the same as or different from a CSI reporting type corresponding to the second CSI.

The first CSI further includes an RI and a CQI.

When a quantity of sub-reference signals included in the reference signal corresponding to the second CSI is greater than 1, the second CSI includes an index of a sub-reference signal resource, and an RI, a PMI, and a CQI that are of a sub-reference signal corresponding to the index; or when a quantity of sub-reference signals included in the reference signal corresponding to the second CSI is greater than 1, the second CSI includes an RI, a PMI, and a CQI.

A priority of the first-type CSI process is higher than a priority of the second-type CSI process.

The quantity of sub-reference signals included in the reference signal corresponding to the second CSI is greater than 1 (A>B1); or the quantity of sub-reference signals included in the reference signal corresponding to the second CSI is equal to 1 (A>B2).

The method further includes the following.

The base station receives third CSI sent by the terminal, where the third CSI is specific to the second-type CSI process.

If the quantity of sub-reference signals included in the reference signal corresponding to the second CSI is greater than 1, and a quantity of sub-reference signals included in a reference signal corresponding to the third CSI is equal to 1, the priority of the second CSI is higher than a priority of the third CSI; or if the quantity of sub-reference signals included in the reference signal corresponding to the second CSI is greater than 1, and a quantity of sub-reference signals included in a reference signal corresponding to the third CSI is equal to 1, a priority of the third CSI is higher than the priority of the second CSI.

The first CSI is specific to a second-type CSI process and the first-type CSI process.

The method further includes the following.

The base station receives the second CSI sent by the terminal, where the second CSI is specific to a first-type CSI process and the second-type CSI process.

The terminal determines that the first CSI and the second CSI need to be sent in a same time unit, and sends only the first CSI when a priority of the first CSI is higher than a priority of the second CSI.

That the priority of the first CSI is higher than the priority of the second CSI may be determined in the following manner: determining, according to at least one piece of the following information, that the priority of the first CSI is higher than the priority of the second CSI: a CSI reporting type, a carrier number of a carrier corresponding to CSI, a CSI process corresponding to the CSI, or an attribute of a reference signal corresponding to the CSI.

That the priority of the first CSI is higher than the priority of the second CSI may be determined in the following manner based on the attribute of the reference signal corresponding to the CSI.

If a reference signal corresponding to one piece of CSI of the first CSI and the second CSI is precoded and a reference signal corresponding to the other piece of CSI is not precoded, the terminal determines, based on an attribute of whether the reference signal corresponding to the CSI is precoded, that the priority of the first CSI is higher than the priority of the second CSI; or if reference signals respectively corresponding to the first CSI and the second CSI are both precoded, the terminal determines, according to attributes of sub-reference signals included in the precoded reference signals corresponding to the CSI, that the priority of the first CSI is higher than the priority of the second CSI.

The first CSI further includes an RI and a CQI.

When a quantity of sub-reference signals included in the reference signal corresponding to the second CSI is greater than 1, the second CSI includes an index of a sub-reference signal resource, and an RI, a PMI, and a CQI that are of a sub-reference signal corresponding to the index; or when a quantity of sub-reference signals included in the reference signal corresponding to the second CSI is greater than 1, the second CSI includes an RI, a PMI, and a CQI.

The CSI reporting type corresponding to the first CSI is the same as or different from a CSI reporting type corresponding to the second CSI.

A priority of the second-type CSI process is higher than a priority of the first-type CSI process.

The quantity of sub-reference signals included in the reference signal corresponding to the second CSI is greater than 1 (A<B1); or the quantity of sub-reference signals included in the reference signal corresponding to the second CSI is equal to 1 (A<B2).

The method further includes the following.

The base station receives the third CSI sent by the terminal, where the third CSI is specific to the second-type CSI process.

If the quantity of sub-reference signals included in the reference signal corresponding to the second CSI is greater than 1, and a quantity of sub-reference signals included in a reference signal corresponding to the third CSI is equal to 1, the priority of the second CSI is higher than a priority of the third CSI, and the priority of the third CSI is higher than the priority of the first CSI (B2>B1>A); or if the quantity of sub-reference signals included in the reference signal corresponding to the second CSI is greater than 1, and a quantity of sub-reference signals included in a reference signal corresponding to the third CSI is equal to 1, a priority of the third CSI is higher than the priority of the second CSI, and the priority of the second CSI is higher than the priority of the first CSI (B1>B2>A).

The method further includes the following.

The base station receives the third CSI sent by the terminal, where the third CSI is specific to the second-type CSI process.

If the quantity of sub-reference signals included in the reference signal corresponding to the second CSI is greater than 1, and a quantity of sub-reference signals included in a reference signal corresponding to the third CSI is equal to 1, the priority of the second CSI is higher than the priority of the first CSI, and the priority of the first CSI is higher than a priority of the third CSI (B2>A>B1); or if the quantity of sub-reference signals included in the reference signal corresponding to the second CSI is greater than 1, and a quantity of sub-reference signals included in a reference signal corresponding to the third CSI is equal to 1, a priority of the third CSI is higher than the priority of the first CSI, and the priority of the first CSI is higher than the priority of the third CSI (B1>A>B2).

The method further includes the following.

If the quantity of sub-reference signals included in the reference signal corresponding to the second CSI and a quantity of sub-reference signals included in a reference signal corresponding to the third CSI both are greater than 1, the second CSI includes an index of the sub-reference signal, and the third CSI does not include an index of the sub-reference signal, a priority of a reporting type corresponding to the second CSI is higher than a priority of a reporting type corresponding to the third CSI.

The method further includes the following.

If the quantity of sub-reference signals included in the reference signal corresponding to the second CSI is greater than 1, and a quantity of sub-reference signals included in a reference signal corresponding to the third CSI is equal to 1, the priority of the second CSI is higher than a priority of the third CSI.

The method further includes the following.

If the quantity of sub-reference signals included in the reference signal corresponding to the second CSI is greater than 1, and the second CSI includes an index of a sub-reference signal resource, the priority of the second CSI is higher than the priority of the first CSI.

Figure 5B:
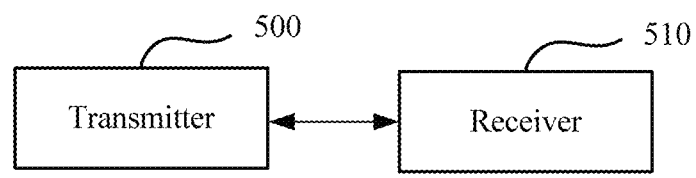
FIG. 5B is another schematic diagram of a CSI measurement and feedback apparatus according to an embodiment of the present invention.

As shown in FIG. 5B, an embodiment of the present invention provides a CSI measurement and feedback apparatus. The apparatus includes a transmitter 50 and a receiver 51.

The transmitter 50 is configured to send a reference signal to a terminal.

The receiver 51 is configured to receive first CSI that is obtained by the terminal by performing channel measurement based on the reference signal, where the first CSI carries a target index, the target index is a first joint index, and the first joint index is an index jointly generated based on a first precoding matrix indicator PMI and a second PMI; or the target index is a second joint index, and the second joint index is an index jointly generated based on a rank indicator RI, the first PMI, and the second PMI; or the target index is the first PMI and the second PMI; or the target index is a third joint index and the second PMI, and the third joint index is an index jointly generated based on the first PMI and the RI; or the target index is a fourth joint index and the first PMI, the fourth joint index is an index jointly generated based on the second PMI and the RI, the first PMI indicates an index of a codeword in a first dimension in W1, and the second PMI indicates an index of a codeword in a second dimension in W1.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product based on the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method, comprising:
receiving, by a terminal, a reference signal sent by a base station;
performing, by the terminal, channel measurement based on the reference signal, to obtain first channel state information (CSI), wherein the first CSI carries a target index, wherein:
the target index is a first joint index, and the first joint index is generated based on a first precoding matrix indicator (PMI) and a second PMI, wherein the first PMI indicates an index of a first codeword in a first dimension, and the second PMI indicates an index of a first codeword in a second dimension; or
the target index is a second joint index, and the second joint index is generated based on a rank indicator (RI), the first PMI, and the second PMI; or
the target index is the first PMI and the second PMI; or
the target index is a third joint index and the second PMI, and the third joint index is generated based on the first PMI and the RI; or
the target index is a fourth joint index and the first PMI, and the fourth joint index is generated based on the second PMI and the RI; and
sending, by the terminal, the first CSI;
wherein the first PMI indicates the index of the first codeword in the first dimension in W1, the second PMI indicates the index of the first codeword in the second dimension in W1, and wherein W1 meets the following rule:
W=W1*W2, wherein $$W_1(i_{1,1}, i_{1,2}) = \begin{bmatrix} \tilde{X}_1^{i_{1,1}} \otimes \tilde{X}_2^{i_{1,2}} & 0 \\ 0 & \tilde{X}_1^{i_{1,1}} \otimes \tilde{X}_2^{i_{1,2}} \end{bmatrix},$$

wherein W is a precoding matrix; $\tilde{X}_1^{i_{1,1}}$ is the first codeword in the first dimension, and a quantity of columns of $\tilde{X}_1^{i_{1,1}}$ is a quantity $N_1$ of antenna ports in the first dimension; $\tilde{X}_2^{i_{1,2}}$ is the first codeword in the second dimension, and a quantity of columns of $\tilde{X}_2^{i_{1,2}}$ is a quantity $N_2$ of antenna ports in the second dimension; $i_{1,1}$ is an index of the first codeword in the first dimension, and $i_{1,2}$ is an index of the first codeword in the second dimension; W2 corresponds to a third PMI; $\otimes$ is a Kronecker product; $\tilde{X}_1^{i_{1,1}}$ comprises discrete Fourier transform (DFT) column vectors, a form of the column vector comprised in $\tilde{X}_1^{i_{1,1}}$ is $v_{m_1}$, and $v_{m_1}$ meets the following rule:

$$v_{m_1} = \begin{bmatrix} 1 & e^{j\frac{2\pi m_1}{o_1 N_1}} & \dots & e^{j\frac{2\pi m_1(N_1-1)}{o_1 N_1}} \end{bmatrix}^t, 0 \leq m_1 \leq N_1 \cdot O_1 - 1,$$

wherein $O_1$ is an over-sampling factor in the first dimension; and a form of a column vector comprised in $\tilde{X}_1^{i_{1,1}}$ is $v_{m_2}$, and $v_{m_2}$ meets the following rule:

$$u_{m_2} = \begin{bmatrix} 1 & e^{j\frac{2\pi m_2}{o_2 N_2}} & \dots & e^{j\frac{2\pi m_2(N_2-1)}{o_2 N_2}} \end{bmatrix}^t, 0 \leq m_2 \leq N_2 \cdot O_2 - 1,$$

and wherein $O_2$ is an over-sampling factor in the second dimension.

2. The method according to claim 1, wherein the first PMI is related to the second PMI, or the third joint index is related to the second PMI, or the fourth joint index is related to the first PMI.

3. The method according to claim 1, wherein:
a set of codewords in the first dimension that correspond to at least M different first PMIs existing in all first PMIs is different from a set of codewords in the second dimension that correspond to second PMIs, wherein a Kronecker product is performed on the first codeword in the first dimension and the first codeword in the second dimension, the set of codewords in the first dimension comprises the first codeword in the first dimension, and the set of codewords in the second dimension comprises the first codeword in the second dimension; or
a set of codewords in the second dimension that correspond to at least M different second PMIs existing in all second PMIs is different from a set of codewords in the first dimension that correspond to first PMIs, wherein a Kronecker product is performed on the first codeword in the first dimension and the first codeword in the second dimension, the set of codewords in the first dimension comprises the first codeword in the first dimension, and the set of codewords in the second dimension comprises the first codeword in the second dimension; and
wherein M is an integer greater than or equal to 2.

4. The method according to claim 3, wherein M is related to an over-sampling factor $O_1$ in the first dimension or a quantity $N_1$ of antennas in the first dimension, or M is equal to a total quantity of all states of the first PMI.

5. An apparatus, comprising:
a receiver, configured to receive a reference signal sent by a base station;
a processor, configured to perform channel measurement based on the reference signal, to obtain a first channel state information (CSI), wherein the first CSI carries a target index I1, wherein:
the target index I1 is a first joint index, and the first joint index is generated based on a first precoding matrix indicator (PMI) and a second PMI, wherein the first PMI indicates an index of a first codeword in a first dimension, and the second PMI indicates an index of a first codeword in a second dimension; or
the target index I1 is a second joint index, and the second joint index is generated based on a rank indicator (RI), the first PMI, and the second PMI; or
the target index I1 is the first PMI and the second PMI; or
the target index I1 is a third joint index and the second PMI, and the third joint index is generated based on the first PMI and the RI; or
the target index I1 is a fourth joint index and the first PMI, and the fourth joint index is generated based on the second PMI and the RI; and
a transmitter, configured to send the first CSI;
wherein:
a set of codewords in the first dimension that correspond to at least M different first PMIs existing in all first PMIs is different from a set of codewords in the second dimension in W1 that correspond to second PMIs, wherein a Kronecker product is performed on the first codeword in the first dimension and the first codeword in the second dimension, the set of codewords in the first dimension comprises the first codeword in the first dimension, and the set of codewords in the second dimension comprises the first codeword in the second dimension; or
a set of codewords in the second dimension that correspond to at least M different second PMIs existing in all second PMIs is different from a set of codewords in the first dimension that correspond to first PMIs, wherein a Kronecker product is performed on the first codeword in the first dimension and the first codeword in the second dimension, the set of codewords in the first dimension comprises the first codeword in the first dimension, and the set of codewords in the second dimension comprises the first codeword in the second dimension; and
wherein M is an integer greater than or equal to 2.

6. The apparatus according to claim 5, wherein the first PMI is related to the second PMI, or the third joint index is related to the second PMI, or the fourth joint index is related to the first PMI.

7. The apparatus according to claim 5, wherein M is related to an over-sampling factor $O_1$ in the first dimension or a quantity $N_1$ of antennas in the first dimension, or M is equal to a total quantity of all states of the first PMI.

8. The apparatus according to claim 5, wherein M is related to an over-sampling factor $O_2$ in the second dimension or a quantity $N_2$ of antennas in the second dimension, or M is equal to a total quantity of all states of the second PMI.

9. A method, comprising:
sending, by a base station, a reference signal to a terminal; and
receiving, by the base station, first channel state information (CSI), wherein the first CSI carries a target index, and the first CSI is obtained by the terminal by performing channel measurement based on the reference signal, wherein:
the target index is a first joint index, and the first joint index is generated based on a first precoding matrix indicator (PMI) and a second PMI; or
the target index is a second joint index, and the second joint index is generated based on a rank indicator (RI), the first PMI, and the second PMI; or
the target index is the first PMI and the second PMI; or
the target index is a third joint index and the second PMI, and the third joint index is generated based on the first PMI and the RI; or
the target index is a fourth joint index and the first PMI, the fourth joint index is generated based on the second PMI and the RI, the first PMI indicates an index of a first codeword in a first dimension, and the second PMI indicates an index of a first codeword in a second dimension;
wherein the first PMI indicates the index of the first codeword in the first dimension in W1, the second PMI indicates the index of the first codeword in the second dimension in W1, and wherein W1 meets the following rule:
W=W1*W2, wherein $$W_1(i_{1,1}, i_{1,2}) = \begin{bmatrix} \tilde{X}_1^{i_{1,1}} \otimes \tilde{X}_2^{i_{1,2}} & 0 \\ 0 & \tilde{X}_1^{i_{1,1}} \otimes \tilde{X}_2^{i_{1,2}} \end{bmatrix},$$

wherein W is a precoding matrix; $\tilde{X}_1^{i_{1,1}}$ is the first codeword in the first dimension, and a quantity of columns of $\tilde{X}_1^{i_{1,1}}$ is a quantity $N_1$ of antenna ports in the first dimension; $\tilde{X}_2^{i_{1,2}}$ is the first codeword in the second dimension, and a quantity of columns of $\tilde{X}_2^{i_{1,2}}$ is a quantity $N_2$ of antenna ports in the second dimension; $i_{1,1}$ is an index of the first codeword in the first dimension, and $i_{1,2}$ is an index of the first codeword in the second dimension; W2 corresponds to a third PMI; $\otimes$ is a Kronecker product; $\tilde{X}_1^{i_{1,1}}$ comprises discrete Fourier transform DFT column vectors, a form of the column vector comprised in $\tilde{X}_1^{i_{1,1}}$ is $v_{m_1}$, and $v_{m_1}$ meets the following rule:

$$v_{m_1} = \begin{bmatrix} 1 & e^{j\frac{2\pi m_1}{o_1 N_1}} & \ldots & e^{j\frac{2\pi m_1(N_1-1)}{o_1 N_1}} \end{bmatrix}^t, 0 \le m_1 \le N_1 \cdot O_1 - 1,$$

wherein $O_1$ is an over-sampling factor in the first dimension; and a form of a column vector comprised in $\tilde{X}_2^{i_{1,2}}$ is $v_{m_2}$, and $v_{m_2}$ meets the following rule:

$$u_{m_2} = \begin{bmatrix} 1 & e^{j\frac{2\pi m_2}{o_2 N_2}} & \ldots & e^{j\frac{2\pi m_2(N_2-1)}{o_2 N_2}} \end{bmatrix}^t, 0 \le m_2 \le N_2 \cdot O_2 - 1,$$

wherein $O_2$ is an over-sampling factor in the second dimension.

10. The method according to claim 9, wherein the first PMI is related to the second PMI, or the third joint index is related to the second PMI, or the fourth joint index is related to the first PMI.

11. The method according to claim 9, wherein:
a set of codewords in the first dimension that correspond to at least M different first PMIs existing in all first PMIs is different from a set of codewords in the second dimension that correspond to second PMIs, wherein a Kronecker product is performed on the first codeword in the first dimension and the first codeword in the second dimension, the set of codewords in the first dimension comprises the first codeword in the first dimension, and the set of codewords in the second dimension comprises the first codeword in the second dimension; or
a set of codewords in the second dimension that correspond to at least M different second PMIs existing in all second PMIs is different from a set of codewords in the first dimension that correspond to first PMIs, wherein a Kronecker product is performed on the first codeword in the first dimension and the first codeword in the second dimension, the set of codewords in the first dimension comprises the first codeword in the first dimension, and the set of codewords in the second dimension comprises the first codeword in the second dimension; and
wherein M is an integer greater than or equal to 2.

12. The method according to claim 11, wherein M is related to an over-sampling factor $O_1$ in the first dimension or a quantity $N_1$ of antennas in the first dimension, or M is equal to a total quantity of all states of the first PMI.

13. An apparatus, comprising:
a transmitter, configured to send a reference signal to a terminal; and
a receiver, configured to receive first channel state information (CSI), wherein the first CSI carries a target index I1, and the first CSI is obtained by the terminal by performing channel measurement based on the reference signal, wherein:
the target index I1 is a first joint index, and the first joint index is generated based on a first precoding matrix indicator (PMI) and a second PMI;
the target index I1 is a second joint index, and the second joint index is generated based on a rank indicator (RI), the first PMI, and the second PMI;
the target index I1 is the first PMI and the second PMI;
the target index I1 is a third joint index and the second PMI, and the third joint index is generated based on the first PMI and the RI; or
the target index I1 is a fourth joint index and the first PMI, the fourth joint index is generated based on the second PMI and the RI, the first PMI indicates an index of a first codeword in a first dimension, and the second PMI indicates an index of a first codeword in a second dimension;
wherein the first PMI indicates the index of the first codeword in the first dimension in W1, the second PMI indicates the index of the first codeword in the second dimension in W1, and wherein W1 meets the following rule: W=W1*W2, wherein $$W_1(i_{1,1}, i_{1,2}) = \begin{bmatrix} \tilde{X}_1^{i_{1,1}} \otimes \tilde{X}_2^{i_{1,2}} & 0 \\ 0 & \tilde{X}_1^{i_{1,1}} \otimes \tilde{X}_2^{i_{1,2}} \end{bmatrix},$$

wherein W is a precoding matrix; $\tilde{X}_1^{i_{1,1}}$ is the first codeword in the first dimension, and a quantity of columns of $\tilde{X}_1^{i_{1,1}}$ is a quantity $N_1$ of antenna ports in the first dimension; $\tilde{X}_2^{i_{1,2}}$ is the first codeword in the second dimension, and a quantity of columns of $\tilde{X}_2^{i_{1,2}}$ is a quantity $N_2$ of antenna ports in the second dimension; $i_{1,1}$ is an index of the first codeword in the first dimension, and $i_{1,2}$ is an index of the first codeword in the second dimension; W2 corresponds to a third PMI; $\otimes$ is a Kronecker product; $\tilde{X}_1^{i_{1,1}}$ comprises discrete Fourier transform DFT column vectors, a form of the column vector comprised in $\tilde{X}_1^{i_{1,1}}$ is $v_{m_1}$, and $v_{m_1}$ meets the following rule:

$$v_{m_1} = \begin{bmatrix} 1 & e^{j\frac{2\pi m_1}{o_1 N_1}} & \ldots & e^{j\frac{2\pi m_1(N_1-1)}{o_1 N_1}} \end{bmatrix}^t, 0 \le m_1 \le N_1 \cdot O_1 - 1,$$

wherein $O_1$ is an over-sampling factor in the first dimension; and a form of a column vector comprised in $\tilde{X}_2^{i_{1,2}}$ is $v_{m_2}$, and $v_{m_2}$ meets the following rule:

$$u_{m_2} = \begin{bmatrix} 1 & e^{j\frac{2\pi m_2}{o_2 N_2}} & \ldots & e^{j\frac{2\pi m_2(N_2-1)}{o_2 N_2}} \end{bmatrix}^t, 0 \le m_2 \le N_2 \cdot O_2 - 1,$$

wherein $O_2$ is an over-sampling factor in the second dimension.

14. The apparatus according to claim 13, wherein the first PMI is related to the second PMI, or the third joint index is related to the second PMI, or the fourth joint index is related to the first PMI.

15. The apparatus according to claim 13, wherein:
a set of codewords in the first dimension in W1 that correspond to at least M different first PMIs existing in all first PMIs is different from a set of codewords in the second dimension in W1 that corresponding to second PMIs, wherein a Kronecker product is performed on the first codeword in the first dimension and the first codeword in the second dimension, the set of codewords in the first dimension comprises the first codeword in the first dimension, and the set of codewords in the second dimension comprises the first codeword in the second dimension; or a set of codewords in the second dimension in W1 that corresponding to at least M different second PMIs existing in all second PMIs is different from a set of codewords in the first dimension in W1 that correspond to first PMIs, wherein a Kronecker product is performed on the codeword in the first dimension and the codeword in the second dimension, the set of codewords in the first dimension comprises the first codeword in the first dimension, and the set of codewords in the second dimension comprises the first codeword in the second dimension; and wherein M is an integer greater than or equal to 2.

16. The apparatus according to claim 15, wherein M is related to the over-sampling factor $O_1$ in the first dimension or the quantity $N_1$ of antennas in the first dimension, or M is equal to a total quantity of all states of the first PMI.

* * * * *